United States Patent
Bryant et al.

(10) Patent No.: US 10,853,242 B2
(45) Date of Patent: Dec. 1, 2020

(54) DEDUPLICATION AND GARBAGE COLLECTION ACROSS LOGICAL DATABASES

(71) Applicant: Hitachi Vantara LLC, Santa Clara, CA (US)

(72) Inventors: Alan Bryant, East Walpole, MA (US); Marty Kulma, Auburn, MA (US); Walter Wohler, Leominster, MA (US); Robert Cooper, Somerville, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 826 days.

(21) Appl. No.: 15/521,618

(22) PCT Filed: Mar. 13, 2015

(86) PCT No.: PCT/US2015/020329
§ 371 (c)(1),
(2) Date: Apr. 25, 2017

(87) PCT Pub. No.: WO2016/148670
PCT Pub. Date: Sep. 22, 2016

(65) Prior Publication Data
US 2017/0249246 A1    Aug. 31, 2017

(51) Int. Cl.
*G06F 12/02* (2006.01)
*G06F 16/23* (2019.01)
*G06F 16/22* (2019.01)

(52) U.S. Cl.
CPC ...... *G06F 12/0261* (2013.01); *G06F 16/2219* (2019.01); *G06F 16/2379* (2019.01); *G06F 2212/1044* (2013.01)

(58) Field of Classification Search
CPC ............ G06F 16/2379; G06F 16/2219; G06F 12/0261
(Continued)

(56) References Cited

U.S. PATENT DOCUMENTS 7,010,779 B2 *  3/2006  Rubin ...................... G06F 8/30
                                                      717/106
7,536,713 B1 *  5/2009  Bartholomew ......... G06F 16/40
                                                      726/7

(Continued)

OTHER PUBLICATIONS

International Search Report of PCT/US2015/020329 dated Jun. 29, 2015.

*Primary Examiner* — Mark E Hershley
(74) *Attorney, Agent, or Firm* — Mattingly & Malur, PC

(57) ABSTRACT

In some examples, a plurality of nodes may each host a respective logical database (LDB) that includes database data that references external resources stored in a storage system. Further, each node may maintain, for each external resource referenced by the respective LDB on that node, a reference count of a number of references in the respective LDB to each external resource and a timestamp associated with the reference count. In response to addition of a reference to a particular external resource in a particular LDB, a node that hosts the particular LDB may be programmed to increment the reference count and update the timestamp for the particular external resource. Similarly, in response to removal of the reference to the particular external resource in the particular LDB, the node hosting the particular LDB is programmed to decrement the reference count and update the timestamp for the particular external resource.

20 Claims, 14 Drawing Sheets

(58) Field of Classification Search
USPC .......................................................... 707/814
See application file for complete search history.

(56) References Cited

U.S. PATENT DOCUMENTS

| | | | |
|---|---|---|---|
| 8,108,451 B2 | 1/2012 | Uceda-Sosa et al. | |
| 8,131,739 B2* | 3/2012 | Wu | G06F 16/10 707/758 |
| 8,549,518 B1* | 10/2013 | Aron | G06F 9/45558 718/1 |
| 9,268,806 B1* | 2/2016 | Kesselman | G06F 16/2255 |
| 2006/0036618 A1* | 2/2006 | Shuma | G06F 16/2282 |
| 2007/0006139 A1* | 1/2007 | Rubin | G06F 16/00 717/106 |
| 2012/0017037 A1 | 1/2012 | Riddle et al. | |
| 2012/0290950 A1* | 11/2012 | Rapaport | H04N 21/8358 715/753 |
| 2013/0073821 A1* | 3/2013 | Flynn | G11C 16/06 711/162 |
| 2013/0173553 A1* | 7/2013 | Apte | G06F 11/1453 707/640 |
| 2013/0227236 A1* | 8/2013 | Flynn | G06F 3/061 711/165 |
| 2013/0339643 A1* | 12/2013 | Tekade | G06F 16/275 711/162 |
| 2014/0201171 A1* | 7/2014 | Vijayan | G06F 11/1453 707/692 |
| 2014/0344718 A1* | 11/2014 | Rapaport | H04L 51/32 715/753 |
| 2015/0066946 A1* | 3/2015 | Fuller | G06F 16/24539 707/741 |
| 2016/0070652 A1* | 3/2016 | Sundararaman | G06F 3/065 711/154 |
| 2016/0196163 A1* | 7/2016 | van Gulik | G06F 16/2379 718/102 |
| 2016/0196320 A1* | 7/2016 | Borowiec | G06F 11/1451 707/624 |
| 2017/0249246 A1* | 8/2017 | Bryant | G06F 16/2379 |

* cited by examiner

700

```
┌─────────────────────────────────────────────────────────────┐
│ RECEIVE, BY A SECOND NODE, FROM A FIRST NODE, A QUERY WITH A │
│ RESOURCE ID OF A RECEIVED FILE TO DETERMINE WHETHER THE SECOND│
│ NODE HAS A VISIBLE OBJECT HAVING A RESOURCE ID THAT MATCHES THE│
│ RESOURCE ID OF THE RECEIVED FILE THAT WAS RECEIVED AT THE FIRST NODE│
│                            702                                │
└─────────────────────────────────────────────────────────────┘
                              │
                              ▼
                    ╱─────────────────╲
                   ╱       FIND         ╲
                  ╱  VISIBLE OBJECT HAVING ID OF ╲───────No──────┐
                   ╲    RECEIVED FILE?   ╱                       │
                    ╲       704        ╱                         │
                     ╲───────────────╱                           │
                              │                                  │
                             YES                                 │
                              ▼                                  │
┌─────────────────────────────────────────────────────────┐     │
│ UPDATE THE TIMESTAMP OF THE VISIBLE OBJECT IN THE        │     │
│ SECOND NODE'S OWN LOCAL GLOBAL TABLE                     │     │
│                      706                                  │     │
└─────────────────────────────────────────────────────────┘     │
                              │                                  │
                              ▼                                  │
┌─────────────────────────────────────────────────────────┐     │
│ SEND A REPLY TO THE FIRST NODE INDICATING THAT           │     │
│ THE SECOND NODE HAS THE VISIBLE OBJECT HAVING A          │     │
│ RESOURCE ID MATCHING THE RESOURCE ID OF THE              │     │
│ RECEIVED FILE                                            │     │
│                      708                                  │     │
└─────────────────────────────────────────────────────────┘     │
                                                                 │
                                                                 │
┌─────────────────────────────────────────────────────────┐     │
│ SEND A REPLY TO THE FIRST NODE INDICATING THAT           │◄────┘
│ THE VISIBLE OBJECT IS NOT AT THE SECOND NODE             │
│                      710                                  │
└─────────────────────────────────────────────────────────┘
```

```
┌─────────────────────────────────────────────────────────────┐
│ RECEIVE, FROM FIRST NODE, A QUERY WITH THE INVISIBLE OBJECT │
│ RESOURCE ID TO DETERMINE WHETHER THIS NODE HAS A VISIBLE    │
│ OBJECT WITH AN EXTERNAL RESOURCE LOCATION MATCHING THE      │
│ EXTERNAL RESOURCE LOCATION OF THE INVISIBLE OBJECT          │
│                            1202                             │
└─────────────────────────────────────────────────────────────┘
                               │
                               ▼
                     ╱ FIND          ╲
                   ╱ A VISIBLE OBJECT ╲        No
                  ╱  MATCHING THE      ╲──────────────┐
                  ╲  EXTERNAL RESOURCE ╱              │
                   ╲  LOCATION?       ╱               │
                     ╲   1204        ╱                │
                               │                      │
                              YES                     │
                               ▼                      │
┌─────────────────────────────────────────────┐       │
│ SEND A REPLY TO THE FIRST NODE INDICATING   │       │
│ THAT THIS NODE HAS A VISIBLE OBJECT         │       │
│ MATCHING THE EXTERNAL RESOURCE LOCATION     │       │
│                  1206                       │       │
└─────────────────────────────────────────────┘       │
                                                      │
┌─────────────────────────────────────────────┐       │
│ SEND A REPLY TO FIRST NODE INDICATING THAT  │       │
│ THE NODE DOES NOT REFERENCE A VISIBLE       │◄──────┘
│ OBJECT WITH A MATCHING EXTERNAL RESOURCE    │
│ LOCTATION                                   │
│                  1208                       │
└─────────────────────────────────────────────┘
```

FIG. 12

DEDUPLICATION AND GARBAGE COLLECTION ACROSS LOGICAL DATABASES

TECHNICAL FIELD

This disclosure relates to the technical field of horizontally scalable distributed architectures, such as for enabling operation of a plurality of logical databases.

BACKGROUND

A horizontally distributed architecture can be increased in scale (i.e., horizontally scaled) by adding more nodes to a system of nodes. However, when data is stored using a horizontally distributed architecture, enabling scalability without sacrificing performance can be problematic. For example, adding horizontal scalability can make some common operations expensive to perform. Various conventional approaches may each have their own set of limitations, such as regarding distribution of data across the architecture. For instance, creating a system that allows adding additional computing nodes to increase system capacity generally leads to increased management complexity, a more complex programming model, and can also result in reduced throughput and increased latency between nodes.

When enabling horizontal scalability, one technique for dividing data is referred to as sharding. A database shard is a horizontal partition containing a portion of data from a database. Each individual partition may be referred to as a shard or a database shard. Each shard may be maintained on a separate database server instance, such as to spread load. For instance, in addition to horizontal partitioning, sharding may divide large horizontally partitionable tables across multiple servers, while smaller tables may be replicated as complete units. Once sharded, each shard partition can be maintained in a separate logical schema instance and/or physical database server. Some types of data can easily be distributed across multiple databases because the data can be easily sharded; however, other types of data can be difficult to distribute because that data cannot be sharded. Further, some data within a database may remain present in all shards, but other data may only be maintained in a single shard. Each shard may serve as the single source for this other data. Accordingly, enabling access to global data while also dividing the data for horizontal scaling continues to be a challenge.

SUMMARY

Some implementations include techniques and arrangements for a horizontally scalable database system that includes a plurality of nodes. Each node may include a logical database that is a portion of an overall database comprised of all the logical databases. For instance, the overall database may be sharded or otherwise divided into logical database portions based at least in part on the user of the data. Each logical database may contain metadata that references actual data stored in one or more storage systems accessible by the plurality of nodes. Further, some examples provide for distribution of global data across the plurality of logical databases on the separate nodes so that not all global data is maintained by all the nodes. For instance, there may be data that is exclusive to a few nodes that other nodes may not have. Accordingly, global data that is accessed by multiple users may be distributed across at least some of the plurality of logical databases such that different nodes may maintain global database information that is different from the global database information at other nodes in the system.

In some examples, the logical databases each may include at least one reference data structure referred to as a local global table that is a portion of an overall global table representative of the global data distributed across an entirety of the nodes. The user database tables may reference the local global tables, which may make most common operations relatively inexpensive to perform, thereby enabling scalability with performance. Additionally, the local global tables may be used, at least in part, to manage de-duplication of data, garbage collection, and operational race conditions at the logical databases. In some cases, the local global data tables may be referenced by multiple user database tables. Further, references from the user database tables to the local global tables may be managed locally on the respective node. Consequently, as one example, operations that are performed on a large amount of data may be performed locally on the particular node, which not only provides scalability, but may also optimize performance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 7 is a flow diagram illustrating an example process for determining if other nodes reference the data object of FIG. 5 according to some implementations.

FIG. 12 is a flow diagram illustrating an example process for garbage collection carried out on another node according to some implementations.

DESCRIPTION OF THE EMBODIMENTS

Figure 1:
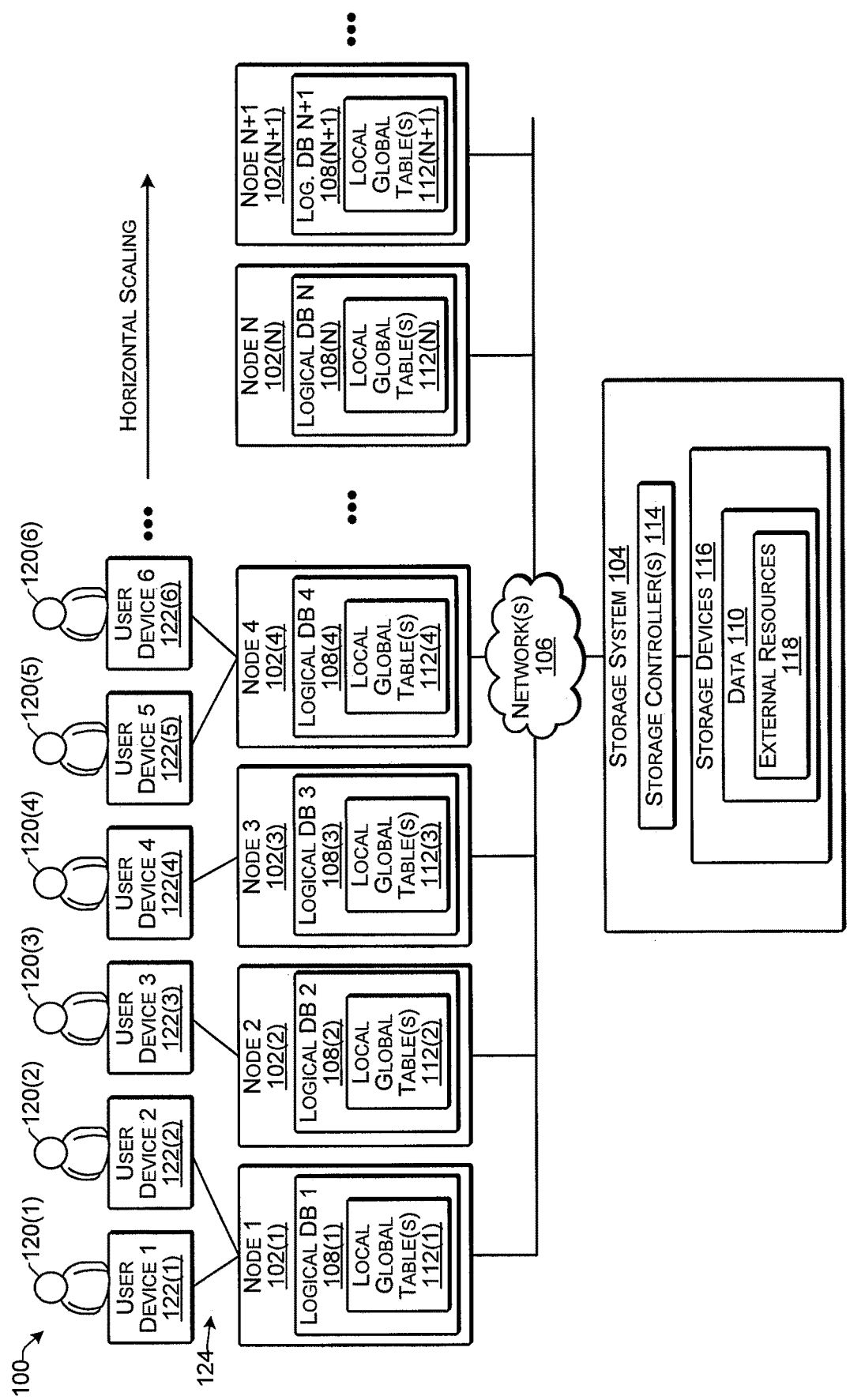
FIG. 1 illustrates an example system architecture enabling horizontal scaling according to some implementations.

Some implementations herein are directed to techniques and arrangements for enabling horizontal scaling of a sharded, partitioned, or otherwise divided database. For instance, database data may be sharded or otherwise divided and distributed across a plurality of nodes in such a way that scalability and integrity of the data can be maintained, while performance is also maintained. As one example, a distributed system may include a plurality of nodes that provide users with access to user data. The system may store metadata for the user data in a database as database data, and the actual contents of the user data, such as user files, may be stored on a storage system as external resources that are external to the database. The database data may be sharded or otherwise divided and distributed across the plurality of nodes. Individual users may access particular nodes to which they are assigned, thereby distributing a user load across the distributed system. Accordingly, database data that may be attributed to particular users may be divided according to per-user basis and placed into logical databases to which the corresponding users may be assigned access.

Additionally, the database may also include database data for global data that is accessed by some or all of the users. For example, it may be undesirable to place complete copies of all global data on each logical database at each node, since this may create inefficiencies in hardware utilization at the nodes, may create race conditions, may create logical inconsistencies during the management of the global data, such as during bulk operations, and so forth. For instance, in such an arrangement, an update to global data at one node might require updates to the global data at each other node, which may result in a large and continual amount of network traffic and node activity. As another example, storing unique local portions of the global data on different nodes with no sharing between nodes may necessitate keeping duplicates of the global data on the storage system. As discussed below, implementations herein enable dividing and distributing the global data across the plurality of logical databases for efficient horizontal scaling.

Horizontal scaling, as provided herein, enables scaling of the number of supported users by adding more nodes to the distributed system so that the nodes can share the workloads. The nodes in the system may have substantially the same or similar software stacks, including a logical database, and substantially the same or similar hardware configurations. Thus, in some instances, the horizontal scaling herein can scale for millions of users by distributing the users' data and global data across different logical databases on different nodes. Further, implementations herein may use reference data structures referred to as local global tables at each node for managing objects.

Furthermore, some implementations herein divide data in a manner that enables most common operations to be handled locally. In some instances, the entire system may be divided into multiple logical databases and most of the database data may be sharded or otherwise divided based on association with particular users. Thus, data specific to a user or a set of users may be maintained at a specific logical database. Each logical database may have its own local global tables that are local to that logical database. For instance, the local global tables may contain metadata for global data that is not entirely divided by all the logical databases. Consequently, there may be global data that is exclusive to a few of the logical databases such that other logical databases may not have that data. Each local global table may maintain a count of the number of user references to the external resources, a timestamp and a resource identifier (ID) of an external resource. In some examples herein, global data may include any data that is shared or otherwise accessed by more than one user.

In some examples, the local global tables are reference data structures that may maintain information about data objects that may be in either a "visible" or an "invisible" state. When an object is in a visible state, this state indicates that the data corresponding to the visible object belongs to, or is otherwise referenced by, a user, but the object could also be common to other users. In some cases, a visible object may be inline de-duplicated before being stored in an object store as an external resource. When a client, such as a user, uploads a file (i.e., a data object), and the data object is in a visible state in any of the logical databases, the particular node may check whether the data object has already been stored as an external resource before storing the data object, and returns a reference of the data object to the user. This may be done to avoid saving the entire payload on the storage system again and may assist with de-duplication and/or single instancing of data. Conversely, any time that a user deletes a file, the reference count for a global object is decreased by one in the local global table. An object is moved from the visible state to the invisible state when the number of references to the object has stayed at zero for a threshold period of time. When the object is in invisible state, this state indicates that the data is not relevant for the corresponding user(s) and this data should be garbage collected. An object may be kept in the invisible state to ensure that the data (i.e., the external resource) is not erased from the storage system if other users maintain a reference to the data.

Implementations here are able to manage scalability with performance by allowing user database tables to reference local global tables and by keeping the local global table as a portion of an overall global table that indicates the state of all the global data in the storage system. In other words, the global table indicates whether any user in the system references particular global objects (i.e., external resources referenced by more than one user). Maintaining and using the local global table as a reference data structure makes most of the common operations relatively inexpensive. Additionally, implementations here may provide inline de-duplication of data and manage operational race conditions effectively. Further, some examples provide astute distribution of global data across a plurality of logical databases on separate nodes so that global data is not entirely shared by all the nodes. For instance, there may be data that is exclusive to a few nodes that other nodes may not have. The local global data tables can be referenced by multiple user database tables. Further, references from user database tables to global tables may be managed locally on the same node. Accordingly, operations that are performed with a large amount of data at once, such as user migration, can be performed locally on the nodes, which not only provides scalability, but also optimizes performance.

For discussion purposes, some example implementations are described in the environment of a horizontally scalable distributed database system including a plurality of nodes. However, implementations herein are not limited to the particular examples provided, and may be extended to other types of devices, other execution environments, other system architectures, and so forth, as will be apparent to those of skill in the art in light of the disclosure herein. Further, while various examples herein refer to tables, such as database tables, object tables, local global tables, and the like, the term "table" is to be broadly interpreted to include any suitable data structure capable of maintaining the information described in association with the tables herein.

FIG. 1 illustrates an example architecture of a system 100 enabling horizontal scaling according to some implementations. The system 100 includes a plurality of computing devices referred to herein as nodes 102 that are able to communicate with each other and at least one storage system 104 over one or more networks 106. The nodes 102 may include a first node 102(1), a second node 102(2), a third node 102(3), a fourth node 102(4) . . . an Nth node 102(N), and an Nth+1 node 102(N+1).

Each node 102 may host or otherwise include a logical database 108 that may include metadata that is representative of a portion of data 110 stored in the storage system 104. Further, each node 102 may include at least one local global table 112, which is a reference data structure that may be used for managing the database data at the logical databases 108 at each node 102, as discussed additionally below. Together, all the local global tables 112 may make up a global table that is representative of all the data 110 in the system 100. Accordingly, in this example, the first node 102(1) includes a first logical database 108(1) and local global tables 112(1); the second node 102(2) includes a second logical database 108(2) and local global tables 112(2); the third node 102(3) includes a third logical database 108(3) and local global tables 112(3); the fourth node 102(4) includes a fourth logical database 108(4) and local global tables 112(4); . . . the Nth node 102(N) includes an Nth logical database 108(N) and local global tables 112(N); and the Nth+1 node 102(N+1) includes an Nth+1 logical database 108(N+1) and local global tables 112(N+1). In some cases, redundant copies (not shown in FIG. 1) of each of the logical databases 108 may be maintained on other nodes 102 within the system 100 for backup, failover, or the like. As one example, the second node 102(2) may maintain a copy of the logical database 108(1) and the first node 102(1) may maintain a copy of the logical database 108(2).

The storage system 104 may include one or more storage controllers 114. For instance, each storage controller 114 may be a server or other suitable computing device, which may include one or more processors, memory, communication interfaces, local storage, and the like, (not shown in FIG. 1). The storage controller 114 is in communication with one or more storage devices 116 that maintain the data 110. In some examples, the storage devices 116 may be any suitable type of computer-readable media, including non-removable and/or removable media, implemented in any type of technology for storage of information, such as magnetic disk storage, optical storage, solid state storage, flash memory, or other memory technology, magnetic tape, RAID storage systems, storage arrays, network attached storage, storage area networks, cloud storage, or any other medium that can be used to store the desired information and that can be accessed by a computing device. Depending on the configuration of the storage system 104, the storage devices 116 may be a tangible non-transitory media to the extent that, when mentioned, non-transitory computer-readable media exclude media such as energy, carrier signals, electromagnetic waves, and/or signals per se.

Furthermore, the data 110 may include any type of data that can be accessed using the logical databases 108. Thus, the data 110 may include a plurality of external resources 118 that are external to the logical databases 108 and that may serve as the actual data represented by the metadata in the logical databases 108. For instance, the external resources 118 may be files, such as documents, images, audio files, financial records, graphics, executable files, object code, applications, scientific data, scripts, source code, spreadsheets, tabulated data, video, multimedia, web content, markup language content, and so forth. Further, in some cases, the external resources 118 may be data other than files, and implementations herein are not limited to files as the external resources 118.

In some examples, the one or more networks 106 may include a local area network (LAN). However, implementations herein are not limited to a LAN, and the one or more networks 106 can include any suitable network, including a wide area network, such as the Internet; an intranet; a wireless network, such as a cellular network, a local wireless network, such as Wi-Fi, and/or close-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the nodes 102 and storage system 104 are able to communicate over the one or more networks 106 using wired or wireless connections, and combinations thereof.

The logical databases 108 may be accessed by a plurality of users 120 using respective user devices 122. In some cases, particular users 120 may be assigned to use particular logical databases 108. For instance, the logical databases 108 may be horizontally partitioned such that the user data for particular users 120 or particular sets of users 120 may be included in a particular logical database 108. Accordingly, a particular user 120 might be granted access to a particular logical database 108 of the plurality logical databases 108, and might not be permitted to access the other logical databases 108. In the illustrated example, a first user 120(1) may use a first user device 122(1) to access the first logical database 108(1) on the first node 102(1). Additionally, a second user 120(2) may use a second user device 122(2) to also access the first logical database 108(1) on the first node 102(1). A third user 120(3) may use a third user device 122(3) to access the second logical database 108(2) on the second node 102(2). A fourth user 120(4) may use a fourth user device 122(4) to access the third logical database 108(3) on the third node 102(3). A fifth user 120(5) may use a fifth user device 122(5) to access the fourth logical database 108(4) on the fourth node 102(4). Further, a sixth user 120(6) may use a sixth user device 122(6) to access also access the fourth logical database 108(4) on the fourth node 102(4). Additionally, while a small number of users are illustrated in this example for the sake of clarity, a much larger number of users 120 may access each logical database 108 on each node 102.

Each user device 122 may be any suitable type of computing device such as a desktop, laptop, tablet computing device, mobile device, smart phone, wearable device or any other suitable type of computing device. In some examples, the user devices 122 may access respective nodes 102 via an application server (not shown in FIG. 1), while in other examples, the user devices 122 may access the nodes 102 directly. Furthermore, the user devices 122 may be able to communicate with the nodes 102 through the one or more networks 106, through separate networks, or through any other suitable type of communication connection. As another example, the one or more networks 106 may be a backend network while the user devices 122 may communicate with the nodes 102 through a frontend network 124. In such a case, the frontend network 124 may encompass any of the types of networks discussed above with respect to the one or more networks 106, or any combination thereof.

Numerous other variations will be apparent to those of skill in the art having the benefit of the disclosure herein.

As discussed additionally below, the system 100 enables horizontal scaling such that essentially any number of additional nodes 102 may be added to the system 100 to enable access by essentially any number of additional users 120. For instance, each of the users 120(1)-120(6) may be able to access the same external resource 118 by accessing their respective logical databases 108(1)-108(4). As one example, suppose that a particular external resource 118 is a portable document (PDF) file. Each of the users 120(1)-120(6) may be able to access the PDF file even though each user may have a different name for the particular PDF file in his or her logical database 108. Accordingly, a single instance of the content of the PDF file may be stored in the storage devices 116 as the external resource 118, but each user 120 may have a different name for the file, may access the file through a different user interface, different application, or the like.

Figure 2:
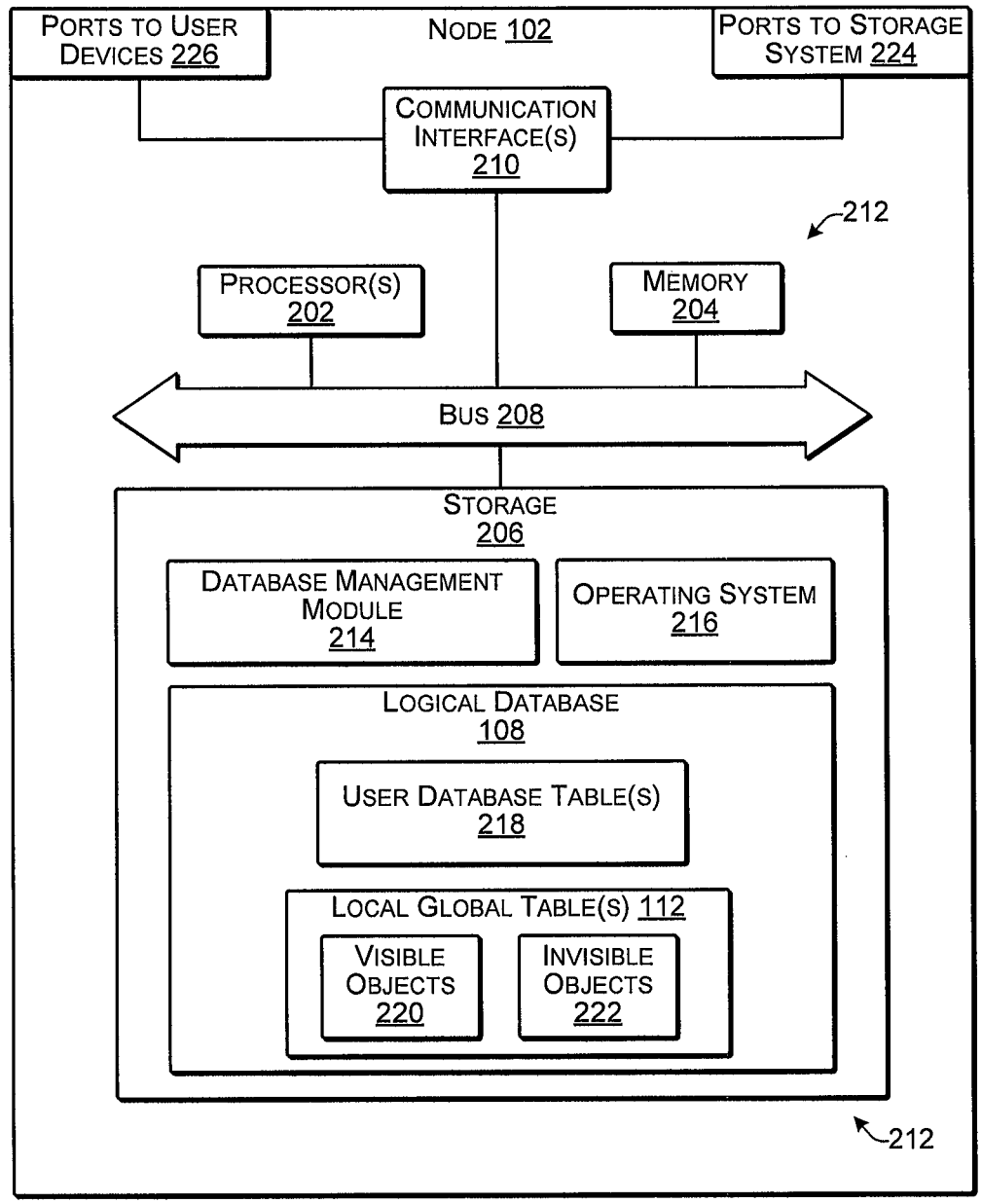
FIG. 2 illustrates an example configuration of a node according to some implementations.

FIG. 2 illustrates select components of an example computing device configured as one of the nodes 102 according to some implementations. In some examples, the node 102 may include one or more servers or other types of computing devices that may be embodied in any number of ways. For instance, in the case of a server, the modules, other functional components, and data storage may be implemented on at least one server, such as in a cluster of servers, a server farm or data center, a cloud-hosted computing service, and so forth, although other computer architectures may additionally or alternatively be used. In the illustrated example, the node 102 may include, or may have associated therewith, one or more processors 202, a memory 204, storage 206, a bus 208, and communication interfaces 210.

Each processor 202 may be a single processing unit or a number of processing units, and may include single or multiple computing units or multiple processing cores. The processor(s) 202 can be implemented as one or more central processing units, microprocessors, microcomputers, microcontrollers, digital signal processors, state machines, logic circuitries, and/or any devices that manipulate signals based on operational instructions. For instance, the processor(s) 202 may be one or more hardware processors and/or logic circuits of any suitable type specifically programmed or configured to execute the algorithms and processes described herein. The processor(s) 202 can be configured to fetch and execute computer-readable instructions stored in the memory 204, which can program the processor(s) 202 to perform the functions described herein. Data communicated among the processor(s) 202 and the other illustrated components may be transferred via the bus 208 or other suitable connection.

In some cases, the storage 206 may be at the same location as the node 102, while in other examples, the storage 206 may be remote from the node 102, such as located on the one or more networks 106 described above. The memory 204 and storage 206 are examples of computer-readable media 212. Such computer-readable media 212 may include volatile and nonvolatile memory and/or removable and non-removable media implemented in any type of technology for storage of information, such as computer-readable instructions, data structures, program modules, or other data. For example, the computer-readable media 212 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the node 102, the computer-readable media 212 may be a type of computer-readable storage media and/or may be a tangible non-transitory media to the extent that, when mentioned, non-transitory computer-readable media exclude media such as energy, carrier signals, electromagnetic waves, and/or signals per se.

The computer-readable media 212 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the node 102. Functional components stored in the computer-readable media 212 may include a database management module 214, which may be one or more computer programs, or portions thereof, and which may provide the logical database 108 and functionality to the logical database 108. Additional functional components stored in the computer-readable media 204 may include an operating system 216 for controlling and managing various functions of the node 102. As one example, these functional components may be stored in storage 206, loaded from the storage 206 into the memory 204, and executed by the one or more processors 202.

In addition, the computer-readable media 212 may store data and data structures used for performing the functions and services described herein. Thus, the computer-readable media 212 may store data for the logical database 108, which may include one or more user database tables 218. In some examples, the user database tables 218 may be sharded tables or otherwise partitioned portions of the overall database that correspond to particular users, and may be arranged as a user schema, as discussed additionally below. Further, the logical database 108 may include one or more of the local global tables 112, which may include entries for visible objects 220 and, in some cases, invisible objects 222. The use and interaction of these tables 112 and 218 is described additionally below. The node 102 may also include or maintain other functional components and data, which may include programs, drivers, etc., and the data used or generated by the functional components. Further, the node 102 may include many other logical, programmatic and physical components, of which those described above are merely examples that are related to the discussion herein.

The communication interface(s) 210 may include one or more interfaces and hardware components for enabling communication with various other devices, such as over the network(s) 106 and/or 124. Thus, the communication interfaces 210 may include, or may couple to, one or more ports 224 that provide connection to the storage system, and one or more ports 226 that provide connection to the user devices. For example, communication interface(s) 210 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein. Additionally, the other computing devices described above, such as the user devices 122 and the storage controller 114 may include hardware configurations similar to that described for the nodes 102, but with different data and functional components to enable them to perform the various functions discussed herein.

Figure 3:
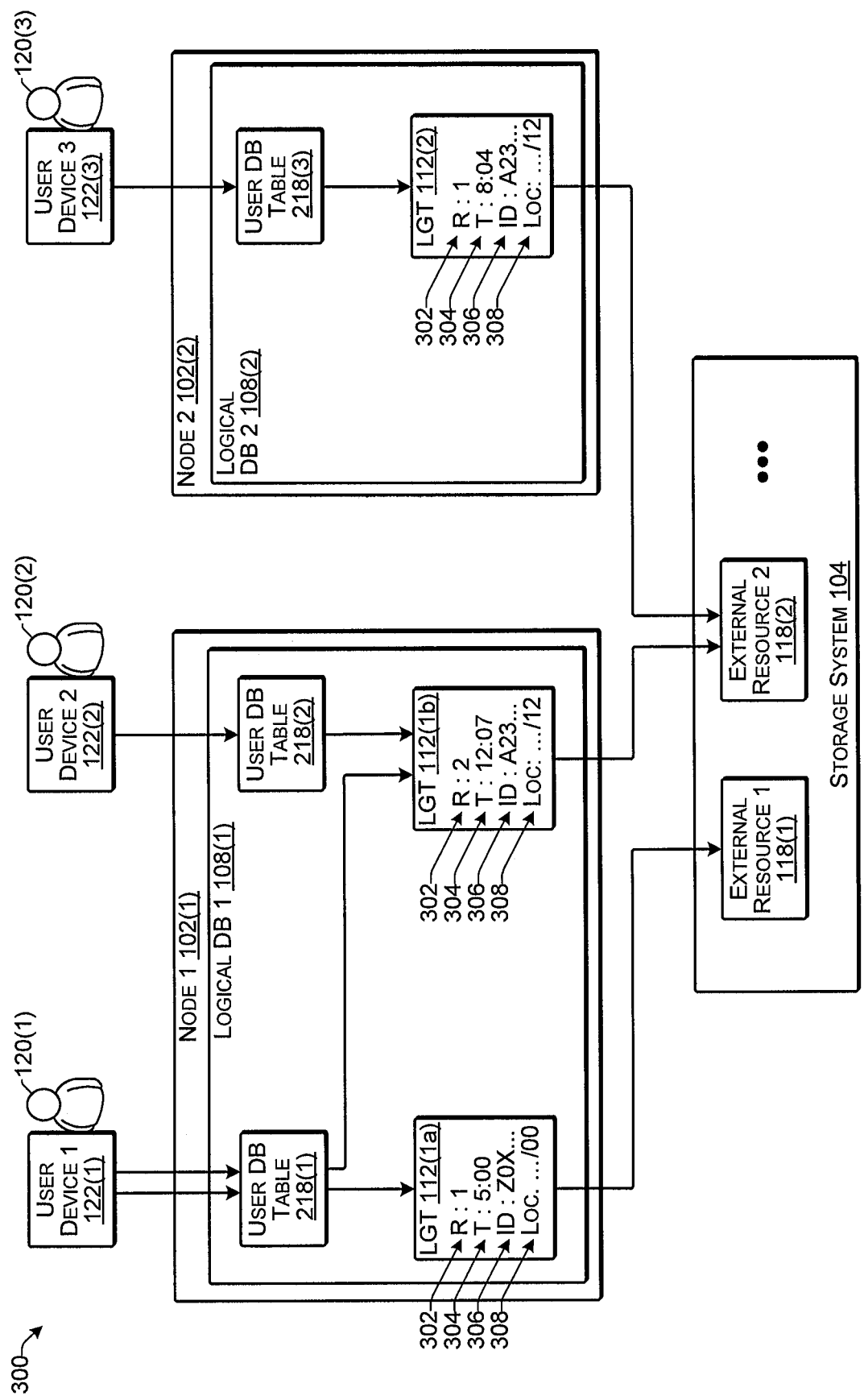
FIG. 3 is a block diagram illustrating interaction between users, the logical databases, and external resources according to some implementations.

FIG. 3 is a block diagram 300 illustrating interaction between the users 120, the logical databases 108, and the external resources 118 according to some implementations. As mentioned above, a logical database 108 may include one or more user database tables 218, such as for maintaining and presenting, to a user, information about the user's data. The user may interact with the logical database 108 which may cause changes to the user database tables 218 and the local global table(s) 112, such as when adding a file, reading a file, saving a file, moving a file, deleting a file, or the like. In some cases, multiple user database tables 218 of different users may refer to the same metadata in a corresponding local global table, which in turn references to the same external resource 118 (e.g., a file or other type of data in the storage system 104).

In the illustrated example, suppose the first user 120(1) performs an operation with respect to a user file, such as adding a first user file corresponding to a first external resource 118(1). The user operation may cause the first node 102 to make an entry in the user DB table 218(1) and further to update or create an entry in a local global table 112(1a) corresponding to the external resource 118(1). For instance, the local global table 112(1a) may include a reference count 302, a modification time or other timestamp 304, a resource identifier 306, and an external resource location 308. The reference count 302 may be the number of user references in the logical database 108(1) to a particular external resource. For instance, if at least one user table references a particular external resource, the external resource may be a visible object. The timestamp 304 may be the most recent time that the object was modified or referenced by a user table. Further, while the figures herein may illustrate only an hour, in some implementations, the timestamp T may include the year, date, hour of the day, minute, second, and so forth. The resource identifier 306 is an identifier for the corresponding external resource 118 that may be unique with respect to identifiers of other external resources in the system. For instance, the resource identifier 306 may be generated by creating a hash of the content of the external resource 118 and some instances may further be distinguished based on a size of the external resource 118 such as a byte size of the external resource 118. In some examples, the hash may be performed by the user computing device 122 prior to adding a file to the storage system, while in other examples, the node 102, the storage controller 114 (not shown in FIG. 3) or other suitable computing device may perform the hashing of the file contents. The external resource location 308 may include a storage identifier of a storage system 104 on which the external resource 118 is stored, plus a path or other storage location indicator that indicates where the external resource 118 is stored on the particular storage system 104.

As another example, the second external resource 118(2) may be a file or other data that is shared by or otherwise accessible by multiple users 120. For instance, the first user 102(1) and the second user 120(2) may reference the second external resource 118(2) through the first logical database 108(1) on the first node 102(1), while the third user 120(3) may reference the second external resource 118(2) through the second logical database 108(2) on the second node 102(2). Accordingly, the local global table 112(1b) on the first logical database 108(1) may have a reference count R 302 of 2, which indicates that the user database tables of two different users reference the second external resource 118(2). Similarly, the local global table 112(2) on the second logical database 108(2) may have a reference count R 302 of 1, which indicates that only a single user database table 218(3) in the second logical database 108(2) references the second external resource 118(2).

As one example, suppose that the external resource 118(2) is a read-only file that was distributed to 5000 employees in a particular company. Accordingly, one of the users 120 may have used a logical database 108 on one of the nodes 102 to save the file to the storage system 104 as the second external resource 118(2). Subsequently, when other users 120 attempt to save the file to the storage system 104, the respective nodes may be able to determine, e.g., based on matching the ID 306 (such as by matching the hashes of the file content) that an instance of the file has already been stored to the storage system 104. Consequently, rather than storing 5000 copies of the file on the storage system 104, only a single instance of the file might be stored as the second external resource 118(2), and the plurality of users 120 may be able to access the stored file based on the information maintained in the local global tables 112.

Figure 4:
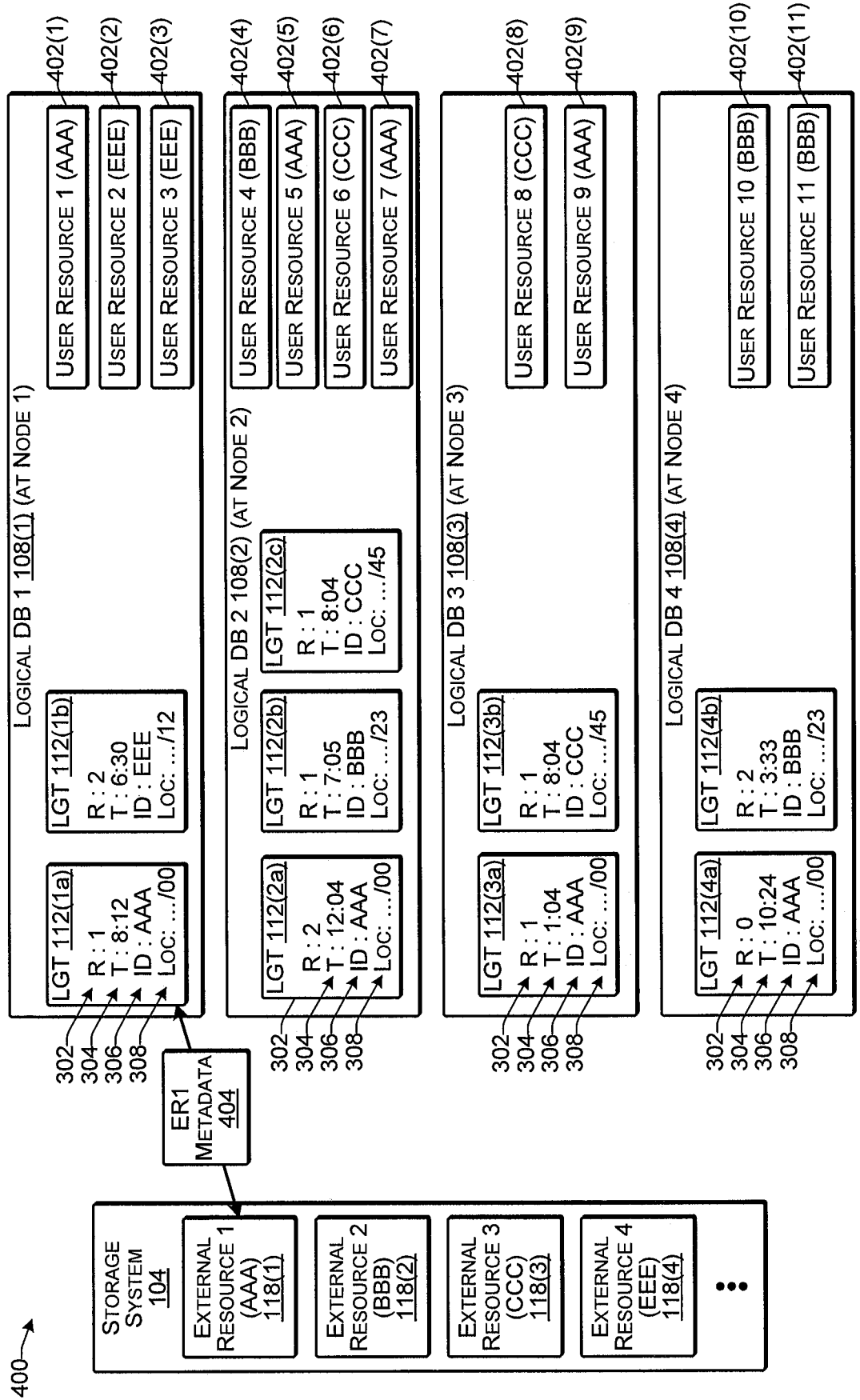
FIG. 4 is a block diagram illustrating relationships between nodes and external resources according to some implementations.

FIG. 4 is a block diagram 400 illustrating relationships between the local global tables, the distributed resources, and the external resources according to some implementations. In this example, each logical database 108 includes a plurality of local global tables 112; however, as mentioned above, the local global tables 112 may be combined into a single local global table at each logical database. A plurality of user resources 402 may be referenced at each logical database 108, such as corresponding to data of individual users. For instance, a user resource 402 may be a file or other data object that is referenced by metadata maintained in the corresponding user database tables (not shown in FIG. 4). The user resources 402 may correspond to particular external resources 118 in the storage system 104. The local global tables 112 may be used to track which users have references to which user resources, such as for ensuring that operations on the user resources are executed properly, that the external resources are correctly stored and maintained in the storage system, that the external resources are not subject to deletion if still being referenced by a user, and so forth. In this example, as indicated at 404, each local global table 112 may be a reference data structure that corresponds to, and may contain metadata for, a particular external resource 118. However, in other examples, as discussed below with respect to FIG. 5, a single local global table may include a plurality of entries, with each entry corresponding to a different external resource 118.

As one example, suppose that the first external resource 118(1), when hashed using a hash function, results in a resource ID of AAA; the second external resource 118(2), when hashed using a hash function, results in a resource ID of BBB; the third external resource 118(3), when hashed using a hash function, results in a resource ID of CCC; and the fourth external resource 118, when hashed using a hash function results in a resource ID of EEE. A plurality of the user resources 402 may have various different filenames, such as may be assigned by the user, by an application, or the like, but may refer to a particular external resource 118 having the same content. For example, the first user resource 402(1) on the first logical database 108(1), the fifth user resource 402(5) and the seventh user resource 402(7) on the second logical database 108(2), and the ninth user resource 402(9) on the third logical database 108(3) all reference the same first external resource 118(1) having content that is hashed to AAA, regardless of how the users name or otherwise refer to their respective user resources in their own user databases. In addition, the local global tables 112 may be used to determine how many users reference a particular external resource, such as for managing the extra resources and the user data. For instance, in the first logical database 108, the first local global table 112(1a) includes a reference count R of 1 to indicate that one user in the logical database 108(1) references the external resource 118(1). Similarly, the second local global table 112(1b) in the first logical database 108(1) includes a reference count R of 2, which indicates that there are two user references to the fourth external resource 118(4), namely the second user resource 402(2) and the third user resource 402(3).

In the second logical database 108(2), the fourth user resource 402(4) references the second external resource 118(2), and the corresponding local global table 112(2b) indicates a reference count R of 1; the fifth user resource 402(5) and the seventh user resource 402(7) reference the first external resource 118(1), and the corresponding local global table 112(2a) indicates a reference count R of 2; and the sixth user resource 402(6) references the third external resource 118(3), and the corresponding local global table 112(2c) indicates a reference count R of 1. In the third logical database 108(3), the eighth user resource 402(8) references the third external resource 118(3), and the corresponding local global table 112(3b) indicates a reference count R of 1; and the ninth user resource 402(9) references the first external resource 118(1), and the corresponding local global table 112(3a) indicates a reference count R of 1. In the fourth logical database 108(4), the tenth user resource 402(10) and the eleventh user resource 402(11) both reference the second external resource 118(2), and the corresponding local global table 112 indicates a reference count R of 2. Further, the fourth logical database 108(4) includes the local global table 112(4a), which previously referenced the first external resource 118(1), but the reference count R has been changed to 0 in this local global table 112(4a). This may indicate that the corresponding user resource has been deleted by the user that previously referenced it and that the corresponding data object may now be in an invisible state as discussed additionally below.

Figure 5:
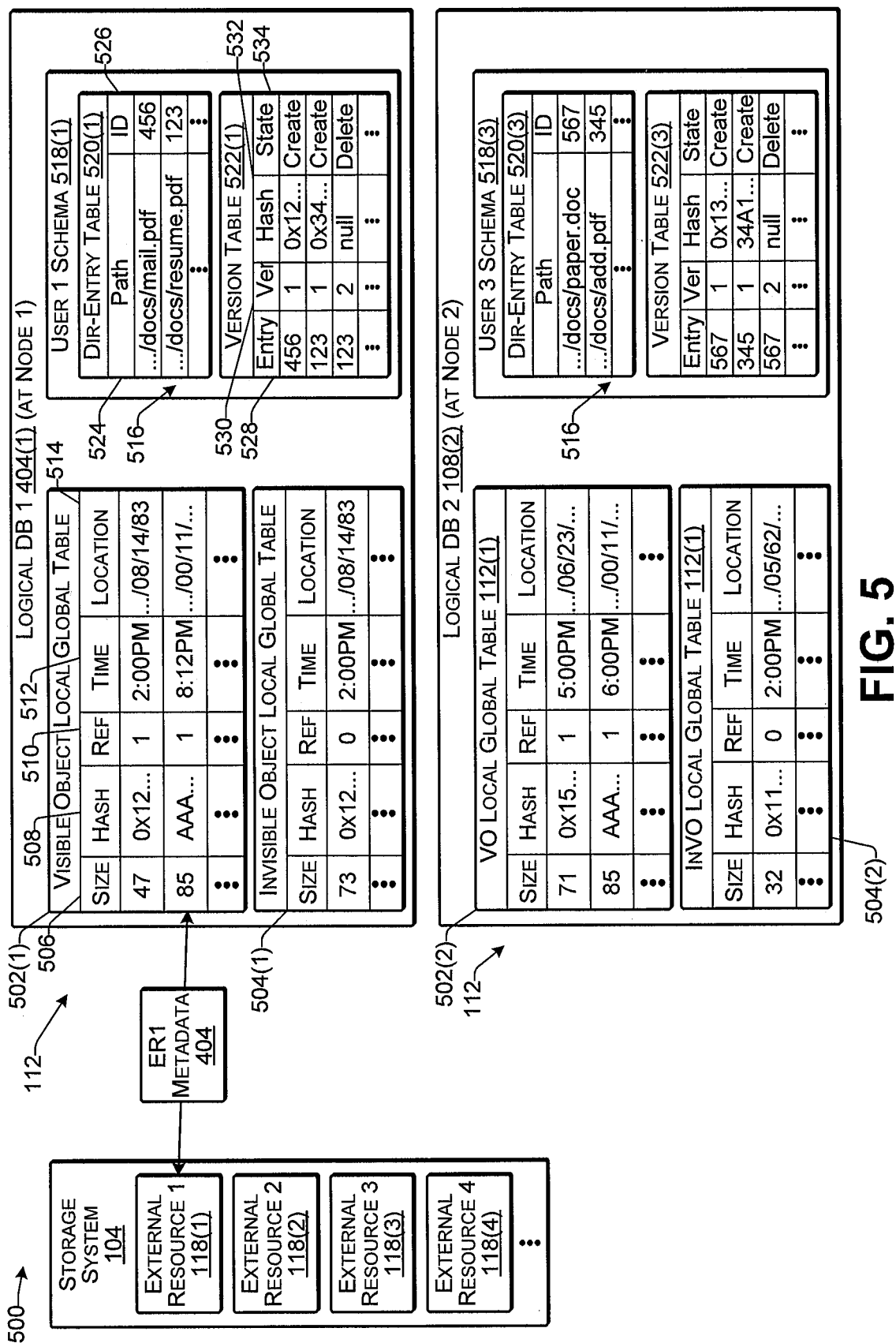
FIG. 5 is a block diagram illustrating examples of the local global tables and user database tables according to some implementations.

FIG. 5 is a block diagram 500 illustrating examples of local global tables and user database tables according to some implementations. In this example, rather than having a local global table for each different object, a single local global table or a pair of local global tables 112 may be maintained having a plurality of rows or other entries, in which, as indicated at 404, each entry corresponds to a separate external resource 118. In the illustrated example, a first local global table 112 may be referred to as a visible object local global table 502 and a second local global table 112 may be referred to as an invisible object local global table 504. Each of these local global tables 502 and 504 is a reference data structure in which the individual entries reference respective corresponding external resources 118 in the storage system 104. Accordingly a first visible object local global table 502(1) and a first invisible object local global table 504(1) may be maintained as reference data structures with the first logical database 108(1), and a second visible object local global table 502(2) and a second invisible object local global table 504(2) may be maintained as reference data structures with the second logical database 108(2).

The local global tables 502, 504 each include columns for size 506, hash 508, reference count 510, time 512, and location 514. The reference count 510, time 512 and location 514 may correspond to the reference count 302, time 304 and external resource location 308, respectively, described above. Further, in some examples, the hash 508 and the size 506 may be combined to form the resource identifier 306 described above. For example, any suitable hash function (e.g., cryptographic, such as SHA variations, or non-cryptographic) may be used to generate a hash result from the content of a file or other external resource. As a measure to guard against the slight possibility of a hash function producing the same result from hashing different content, the file size may be combined with the hash result to produce the resource ID 306 in some examples. In other examples, however, the hash result alone may be used as the resource ID.

The example of FIG. 5 further illustrates user database tables 516, which may be referred to as a user schema 518. There may be an individual user schema 518 for each user, which may be used for managing the user's data in the logical database. The user database tables 516 may include a dir-entry table 520 and a version table 522. The dir-entry table 520 includes a path 524 for a data object, and an identifier (ID) 526, which may be assigned by the user, an application or the logical database. For example, the storage locations of the user's files in a file system may be determined from the path 524. In some cases, the same external resource 118 may be referred to by different user files with different paths 524. The example of FIG. 5 illustrates a first user schema 518(1), which may correspond to a first user discussed above with respect to FIG. 1, who may access the first logical database 108(1), and a third user schema 518(3), which may correspond to the third user discussed above with respect to FIG. 1, who may access the second logical database 108(2). Thus, the first user schema 518(1) includes a dir-entry table 520(1) and a version table 522(1), while the third user schema 518(3) includes a dir-entry table 520(3) and a version table 522(3). The schema of the second user is not shown in logical database 108(1) for clarity of illustration.

Additionally, the version table 522 may track versions of the user's files, and may include an entry 528 for the file, a version number 530, a hash 532 of the file content, and a state 534. The state 534 may indicate the state of the corresponding file. For example, when a file is first created or otherwise added to the user's files during an add operation, the state may be "create". Similarly, when the user deletes a file, the state may be "delete". However, the "add" and the "delete" operations are managed, as discussed below, to ensure that the data is de-duplicated, has no extra references, and the data is never lost. For example, when a file is uploaded or otherwise added by a user, the user device may first ask the node whether the node already has the file stored as an external resource. The node may determine, as described below with respect to FIG. 6, whether the content of the file is already stored on the storage system as an external resource. If not, the user computing device may upload the file to the storage system, and the node may create an entry in the invisible object local global table 504. For instance, the entry in the invisible object local global table 504 may indicate that the state of the object is "in-progress". After the upload of the file is complete, the node may create an entry in the version table 522 that may have a state of "create". For example, a file might only be considered to "exist" in the user file system if the file is retrievable, i.e., the file has been completely uploaded. Further, after the upload of the file is complete, the corresponding metadata may be moved from the invisible object local global table 504 to the visible object local global table 502, and the state may be changed from "in-progress" to "complete", which means that the object is now visible, and which state may be indicated by the metadata being located in the visible object local global table 502, rather than the invisible object local global table 504.

In some examples, the user schema 518 may include a file system schema such that the user database tables 516 store information for providing a file system for the respective user. Additionally, the data management techniques herein provide a consistent state between a user's file system schema and the visible objects maintained in the visible object local global table 502. For instance, the visible objects entries are maintained on the same logical database as the user file system schemas that reference those entries. Accordingly, most operations herein performed via a user file system with respect to the visible objects are performed in the same local database. Further, in some examples, the invisible object local global table 504 and the visible object local global table 502 may be the same table, such as with one or more additional columns to indicate states. Other states that may apply to invisible objects may be "pending garbage collection", which indicates that the associated external resource may be ripe for deletion, and "failed" which may indicate that the add operation failed for some reason and may need to be restarted.

The version table may track different versions of the same file. For example, when a user makes a change to a file, but saves the file with the same name, the new version of the file is stored to the storage system as a new external resource. Thus, the user may be able to restore a previous version based on the information maintained in the version table. Further, over time, certain versions may be pruned from the storage system, and when a version has been deleted from the storage system, the hash may be changed to "null" and the corresponding reference count decremented.

Examples of other operations that may be performed in addition to "add" operation include "read", "move", "delete", "pruning" and "garbage collection". The read operation may include determining the path of a requested file from an entry in the dir-entry table 520, and retrieving the associated external resource from the storage system 104 based on the path.

The move operation may include moving a file across file systems, i.e., from a source logical database 108 to a target logical database 108. For instance, the source file version may remain on the source logical database when a new version of the file is created for a move operation across file systems. Creating the new version may include copying the hash 508, size 506, and location 514 from the original entry in the visible object local global table 502, and creating a new entry, or updating an existing entry, in the visible object local global table 502 on the destination logical data base. After the new entry has been created (or the reference count on an existing entry has been incremented by one) in the target visible object local global table 502, the original entry in the source visible object local global table 502 is decremented by one. Accordingly, only the metadata for a file is moved to a new node, while the file itself, i.e., the external resource remains at the same location in the storage system. The move operation is safe because the original entry will remain in the source visible object local global table 502 for at least the transaction, and for a threshold period of time thereafter, as discussed below with respect to delete and garbage collection. Similarly, when an entire file system is migrated from one logical database to another, such as for migrating a user to a new node, all the references on the source logical database may be copied and added to the target logical database. The reference counts for these references are then decremented accordingly on the source database, and garbage collection will take care of eventual removal of the metadata from the source logical database.

The pruning operation, as discussed above, includes removing certain entries from the version table 522, such as after a period of time and/or if the number of versions exceeds a threshold. Various techniques may be applied for selecting versions to remove from the version table, such as leaving some older versions intact, or the like.

The delete and pruning operations are related in that when a user deletes a file, the reference to the file may be removed from the user's database tables 516, but the reference to the file is not removed from the visible object local global table 502 or the invisible object local global table 504 until certain conditions for garbage collection have been met. Thus, the delete operation merely results in the reference count 510 in the corresponding entry in the visible object local global table 502 being decremented by one. Subsequently, the garbage collection operation may be performed as discussed additionally below with respect to FIGS. 11-12. The garbage collection operation may be an atomic operation that uses the timestamp associated with a reference count to determine whether to collect visible object entries in the visible object local global table 502. During garbage collection, the node determines whether any entries in the visible object local global table 502 have a reference count R that has been decremented to zero. Further, the reference count may have remained at zero for a threshold period of time. If so, the node may move the entry from the visible object local global table 502 to the invisible object local global table 504. The node may then send queries to other nodes to determine whether any other nodes in the system reference the external resource corresponding to the entry. If not an instruction is sent to the storage system to cause the corresponding external resource to be marked for deletion or otherwise deleted from the storage system. Following deletion of the external resource from the storage system, the corresponding entry is deleted from the invisible object local global table 504. On the other hand, if a visible object local global table 502 on another node includes a reference to the external object, then the entry is merely removed from the invisible object local global table 504 on the querying node, but the corresponding external resource is not deleted from the storage system.

FIGS. 6-7 and 11-14 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

Figure 6:
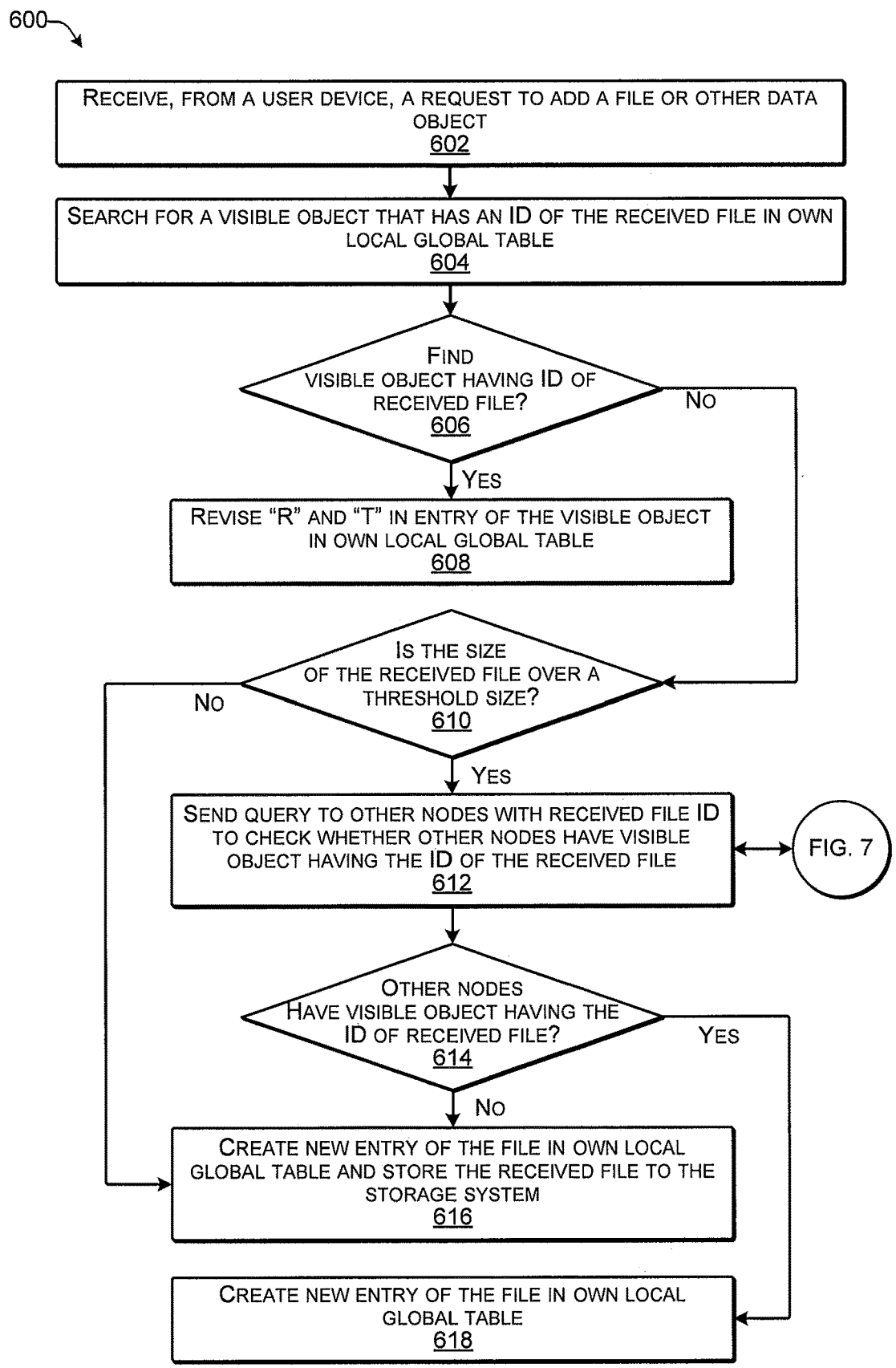
FIG. 6 is a flow diagram illustrating an example process for adding a data object according to some implementations.

FIG. 6 is a flow diagram illustrating an example process 600 of an add operation that include deduplication while performing the add operation according to some implementations. In some examples, the process 600 may be executed by at least one node in a distributed system or other suitable computing device. For instance, the add operation may include deduplication techniques to avoid storing duplicates of data already stored in the storage system.

At 602, the node may receive a file or other data object from an associated user, or, in some examples, may receive a request from a user device to upload the data object prior to actually transferring any data. For example, a node may receive the data object from the user's computing device such as from an application or operating system on the user's computing device, through an application programming interface (API) or through various other techniques. Accordingly, the particular user's database tables will be updated to include metadata for the data object. In the case in which the user device just sends a request to add the file, the user device may include, with the request, a hash of the file contents that the node can use as the resource ID.

At 604, the node may search its own local global table(s) for a visible object that has the same ID as the received data object. As one example, suppose that the data object is a new file that is being saved by the user for storage on the storage system with other files maintained by the user. The user computing device that wants to upload the file, or the node itself, may calculate a hash for the file and the node may generate a resource ID for the received file. As mentioned above, in some cases the resource ID may be the hash result, while in other cases, the resource ID may be the hash combined with other information such as the file size. The node may compare the resource ID for the received file with the resource IDs of other resources referenced in the local global table maintained by the node to attempt to determine whether an external resource that is the same as the new file already exists in the storage system and is already referenced in the node's own logical database.

At 606, if the node finds a visible object having a resource ID that matches the resource ID of the received file, the process moves to block 608. On the other hand, if a matching visible object is not found locally on the node, the process may move to block 610.

At 608, if the node determines there is already visible object having a resource ID that matches the resource ID of the received file, the node may revise the local global table for the visible object by incrementing the reference count R by one, and may revise the timestamp for the visible object by changing the timestamp T to the time at which the file was received from the user device.

At 610, on the other hand, if a matching visible object is not found locally on the node, the node may check to determine whether the size of the received file is over a threshold size. For example, if the received file is below a threshold size it may be more efficient to proceed with saving the file to the storage system, rather than asking other nodes whether the other nodes have a visible object corresponding to the received file. The threshold size may be dependent on various factors, such as cost of data storage, available network bandwidth between the nodes, available bandwidth between the nodes and the storage system, and so forth.

At 612, if the node determines that the received file is larger than the threshold size, the node may send a request to other nodes along with the resource ID of the received file. The process carried out by the other nodes in response to receiving this request from the node is described below with reference to FIG. 7.

At 614, the node may receive replies from the other nodes and may determine whether any of the other nodes have a visible object having a resource ID that matches the resource ID of the received file. If so, the process proceeds to block 618 and if not, the process proceeds to block 616.

At 616, if the node determines that no other nodes have a visible object with a resource ID that matches the resource ID of the received file, the node may create a new entry for the file in its own local global table and may store the received file to the storage system. For example, the node may create a new entry with a reference count R of 1, with a timestamp T indicating the time at which the received file was received, with a resource ID of the received file, and with a location that identifies the storage system path of the location in the storage system at which the received file is stored.

At 618, on the other hand, if the node determines that another node has a visible object having the ID of the received file, this indicates that the file content itself has already been stored in the storage system, and therefore there is no need to store the file content again. Accordingly, the node may create a new entry for the received file in its own local global table with a reference count R of one, with a timestamp T indicating a time at which the received file was received, with a resource ID of the received file, and with a location that identifies location of an external resource in the storage system that corresponds to the resource ID of the received file. In some examples, the storage location of the external resource may be provided to the node by the one or more other nodes that have a visible object with an ID that matches the resource ID of the received file. For instance, in replying to the requesting from the node, the other node that has the visible object may provide, with the reply, the path or other storage location information for the external resource that corresponds to the resource ID of the received file.

FIG. 7 is a flow diagram illustrating an example process 700 that may be executed by a second node in response to receiving a request from a first node for determining whether a visible object is referenced on the second node according to some implementations. In some examples, the process 700 may be executed by at least one node in a distributed system or other suitable computing device, such as in response to receiving a request from another node in the distributed system.

At 702, the second node receives, from a first node, a request with a resource ID of a received file. The request may ask the second node to determine whether the second node has a visible object having a resource ID that matches the resource ID of the received file that was received at the first node.

At 704, the second node determines whether there is a visible object having a resource ID that matches the resource ID of the received file. For instance, the second node may check the local global table(s) maintained by the second node by comparing the resource ID received with the request with the resource IDs maintained in the local global table(s) to determine whether there is a match.

At 706, if the second node finds a matching entry in its own local global table, the second node may update the timestamp T of the entry in its own local global table. In some examples, the updated timestamp may be the time at which the received file was received by the first node, if such information is transmitted with the request from the first node. In other examples, the timestamp entry may be the time at which the request was received from the first node.

At 708, the second node may send a reply to the first node indicating that the second node has a visible object having a resource ID matching the resource ID of the received file. In some examples, as mentioned above, the second node may include, with the reply, the path and/or other storage location information indicating the location at which the corresponding external resource is stored in the storage system.

At 710, on the other hand, if the second node does not have a visible object having a resource ID that matches the resource ID of the received file, the second node may send reply to the first node indicating that the visible object is not at the second node.

Figure 8A:
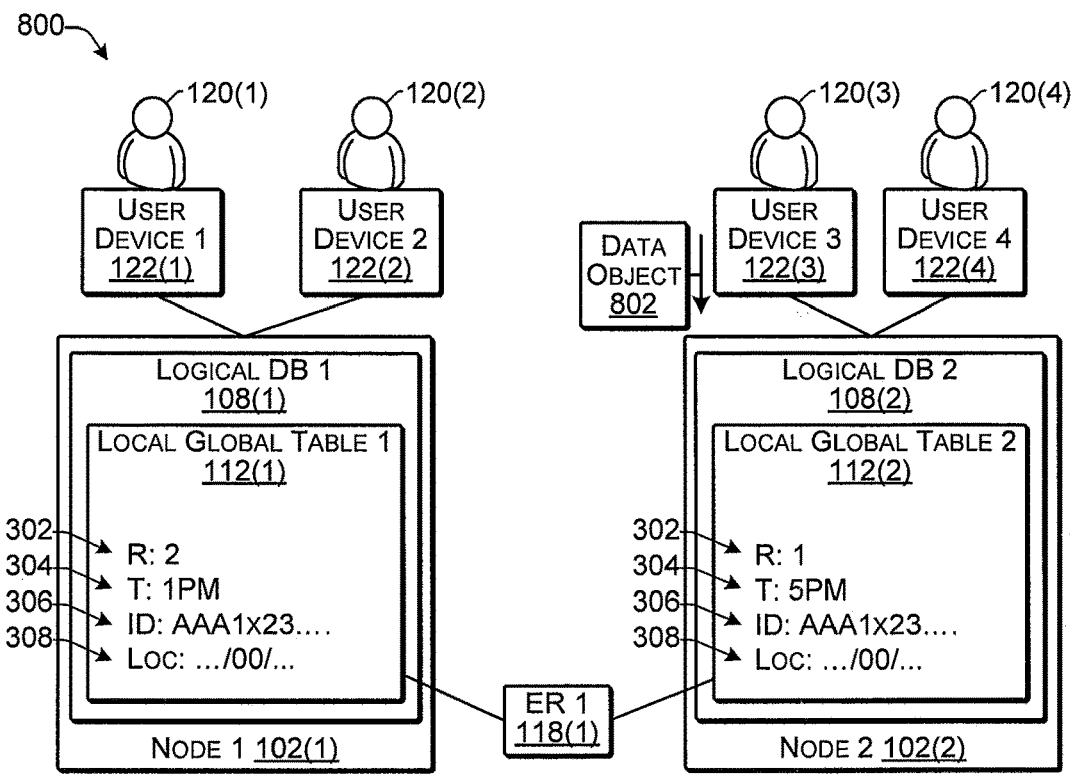
FIGS. 8A and 8B are block diagrams illustrating operations with local global tables for an add operation according to some implementations.
Figure 8B:
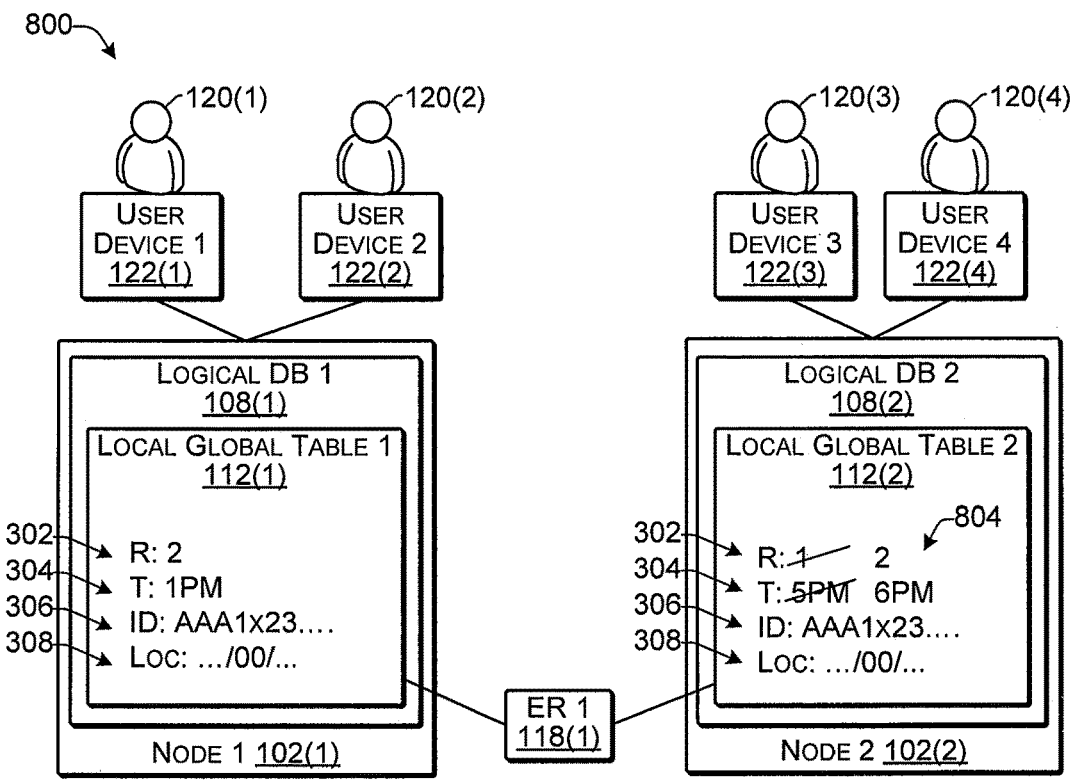

FIGS. 8A and 8B are block diagrams of a system 800 that may correspond at least in part to the system 100 described above according to some implementations. FIGS. 8A and 8B illustrate an example add operation, such as due to a user uploading a file, saving a new data object, or the like, according to some implementations. The add operation described with respect to FIGS. 8A and 8B corresponds at least in part to the process of FIG. 6 discussed above. As discussed above, for a data add operation, the receiving node may first check its own local logical database for visible objects to determine whether there is an existing reference that matches the received data. If there is not an existing reference that matches the received data in the local logical database, the receiving node may send a query to the other nodes in the system to determine whether a reference to the received data object exist in any of the databases. If a reference exists, then the timestamp T for the reference is atomically updated for the object in the remote database and the information about the matched reference are returned to the receiving node. A local reference to a visible object may then be created by the receiving node in its own local global table. In some cases, at least a portion of the add operation may be atomic such that it may appear as a unitary or otherwise indivisible operation to other parts of the system. For instance, when a reference count R is updated, the associated timestamp T may also be updated atomically.

As illustrated in FIG. 8A, the first logical database 108(1) on the first node 102(1) is accessible by the first user 120(1) and the second user 120(2). Further, the second logical database 108(2) on the second node 102(2) is accessible by the third user 120(3) and the fourth user 120(4). In this example, the first logical database 108(1) includes a first local global table 112(1) that includes two references to the first external resource 118(1), and the second logical database 108(2) includes a second local global table 112(2) that includes one reference to the first external resource 118(1). For instance, suppose that the first user 120(1), the second user 120(2), and the fourth user 120(4) all maintain user references to the external resource 118(1) in their respective database tables (not shown in FIG. 8A). Further, suppose that the third user 120(3) uploads, saves, or otherwise adds a data object 802, such as a file, to the second logical database 108(2), e.g., at a time 6:00 PM.

As discussed above with respect to FIG. 7, the second node 102(2) may first check its own local global table 112(2) to determine whether there is a reference to the data object 802 already in existence in the second local global table 112(2). For instance, the second node 102(2) may determine a resource ID from the content of the data object 802, such as by using a hash function or other suitable technique, and may compare the resource ID of the received data object 802 with any existing resource IDs 306 in the local global table 112(2).

As illustrated in FIG. 8B, in this example, suppose that the resource ID for the data object 802 matches the resource ID for an entry in the local global table 112(2). For instance, when the first external resource 118(1) was first stored to the storage system (not shown in FIG. 8B), the resource ID 306 may have been determined based at least in part on the content included in the first external resource 118(1). Accordingly, as illustrated in FIG. 8 B, at 804, the second node may update the second local global table 112(2) by changing the reference count R from 1 to 2, and by changing the time T from 5:00 PM to 6:00 PM. Accordingly, the second logical database 108(2) provides a reference of the external resource 118(1) to the third user.

Figure 9A:
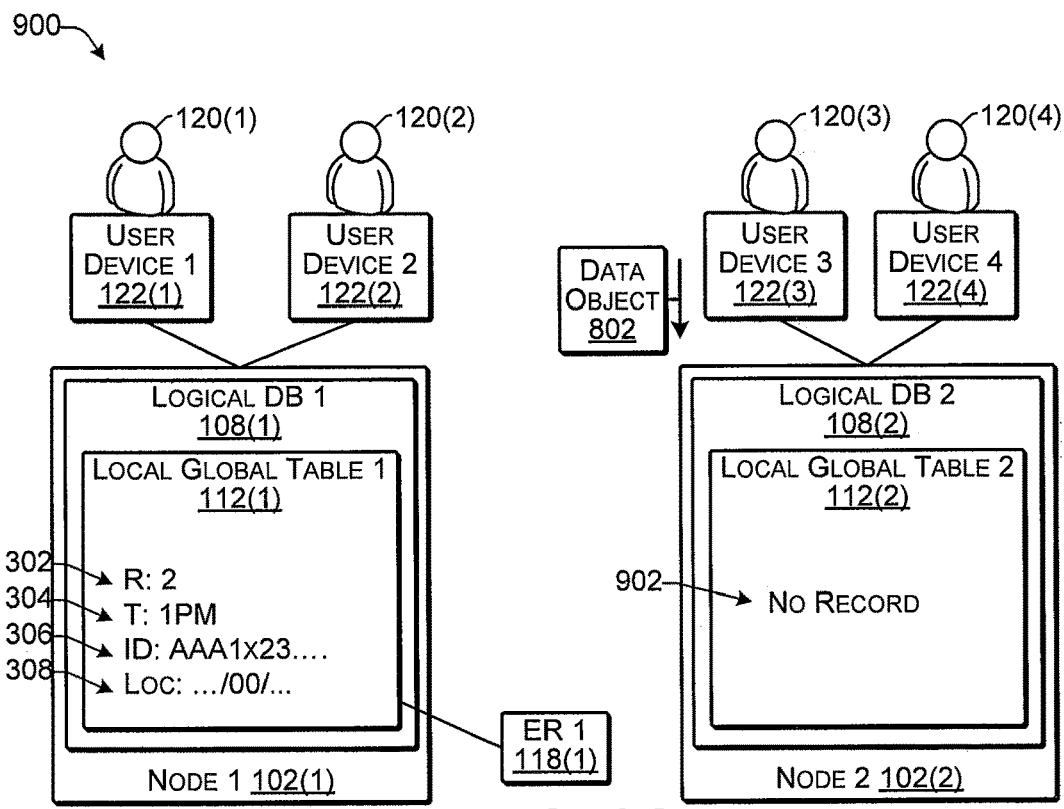
FIGS. 9A and 9B are block diagrams illustrating operations with local global tables for an add operation according to some implementations.
Figure 9B:
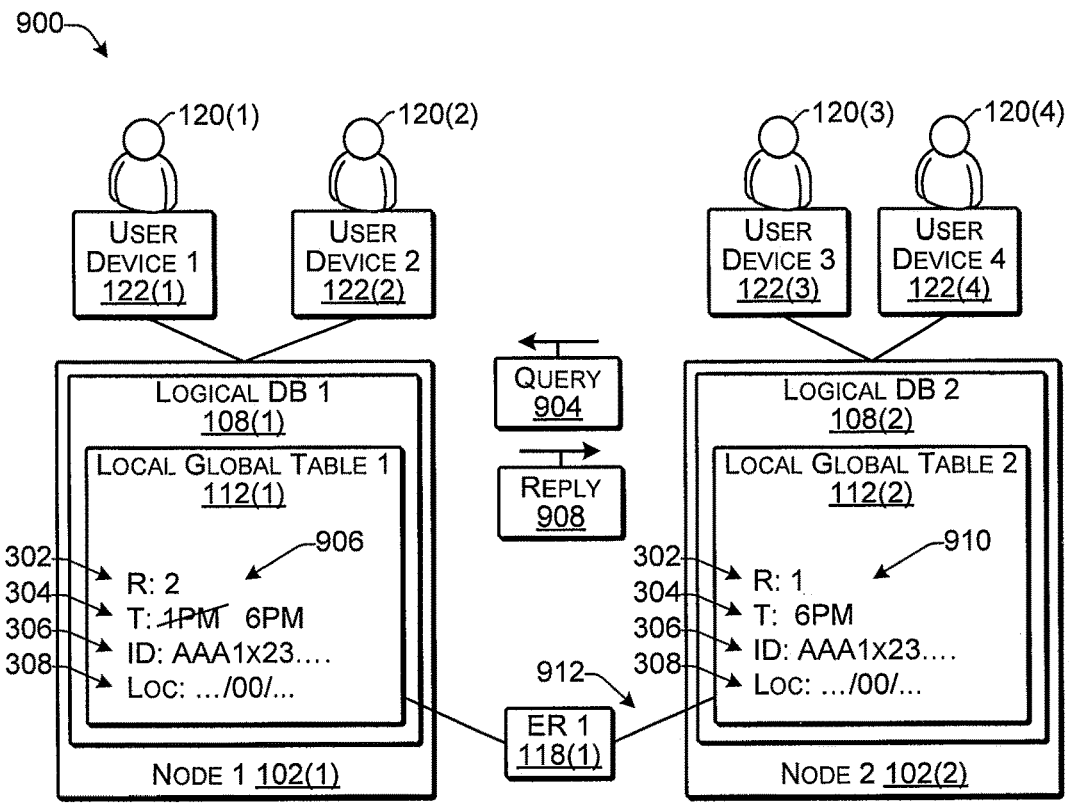

FIGS. 9A and 9B are block diagrams of a system 900 that may correspond at least in part to the system 100 described above according to some implementations. FIGS. 9A and 9B illustrate an example data add operation when a reference to the data object does not already exist in the local global table of the receiving node. The add operation described with respect to FIGS. 9A and 9B corresponds at least in part to the processes of FIGS. 6 and 7 discussed above.

As illustrated in FIG. 9A, the first logical database 108(1) on the first node 102(1) is accessible by the first user 120(1) and the second user 120(2). Further, the second logical database 108(2) on the second node 102(2) is accessible by the third user 120(3) and the fourth user 120(4). In this example, the first logical database 108(1) includes a first local global table 112(1) that includes two references to the first external resource 118(1), and the second logical database 108(2) includes a second local global table 112(2) that includes no references to the first external resource 118(1). For instance, suppose that the first user 120(1) and the second user 120(2) maintain user references to the external resource 118(1) in their respective database tables (not shown in FIG. 8A), but the third user 120(3) and the fourth user 120(4) do not. Further, suppose that the third user 120(3) uploads, saves, or otherwise adds the data object 802, such as a file, to the second logical database 108(2), e.g., at a time 6:00 PM.

The second node 102(2), as the receiving node, may first check its own local global table 112(2) to determine whether there is a reference to the data object 802 already in existence in the second local global table 112(2). For instance, the second node 102(2) may determine a resource ID from the content of the data object 802, such as by using a hash function or other suitable technique, and may compare the resource ID of the received data object 802 with any existing resource IDs 306 in the local global table 112(2). In the illustrated example, as indicated at 902, there is no record in the local global table 112(2) that matches the resource ID of the received data object 802. Following this determination, the second node 102(2) may send a query 904 to the first node 102(1) requesting that the first node 102(1) check the first local global table 112(1) to determine whether there are any references to data objects that match the resource ID of the received data object 802.

As illustrated in FIG. 9B, suppose that the resource ID for the data object 802 matches the resource ID 306 for an entry in the first local global table 112(1). Consequently, as indicated at 906, the first node 102(1) may update its timestamp 304 for the data object based on the time that the data object 802 was received at the second node 102(2), e.g., by changing the timestamp 304 from 1:00 PM to 6:00 PM. Additionally, the first node 102(1) may send a reply 908 to the second node 102(2) indicating that a reference to the data object is maintained in the local global table 112(1) at the first node 102(1). In some examples, the reply to the second node 102(2) may include the external resource location information 308 associated with the reference to the data object in the local global table 112(1). Accordingly, the second node may receive a reply 908, and, as indicated at 910, may create an entry in the local global table 112(2) that includes a reference count R of 1, a timestamp T of 6:00 PM, the resource ID of the data object 802, and the external resource location information 308 received from the first node 102. Accordingly, as indicated at 912, the second logical database 108(2) provides a reference of the external resource 118(1) to the third user.

Figure 10A:
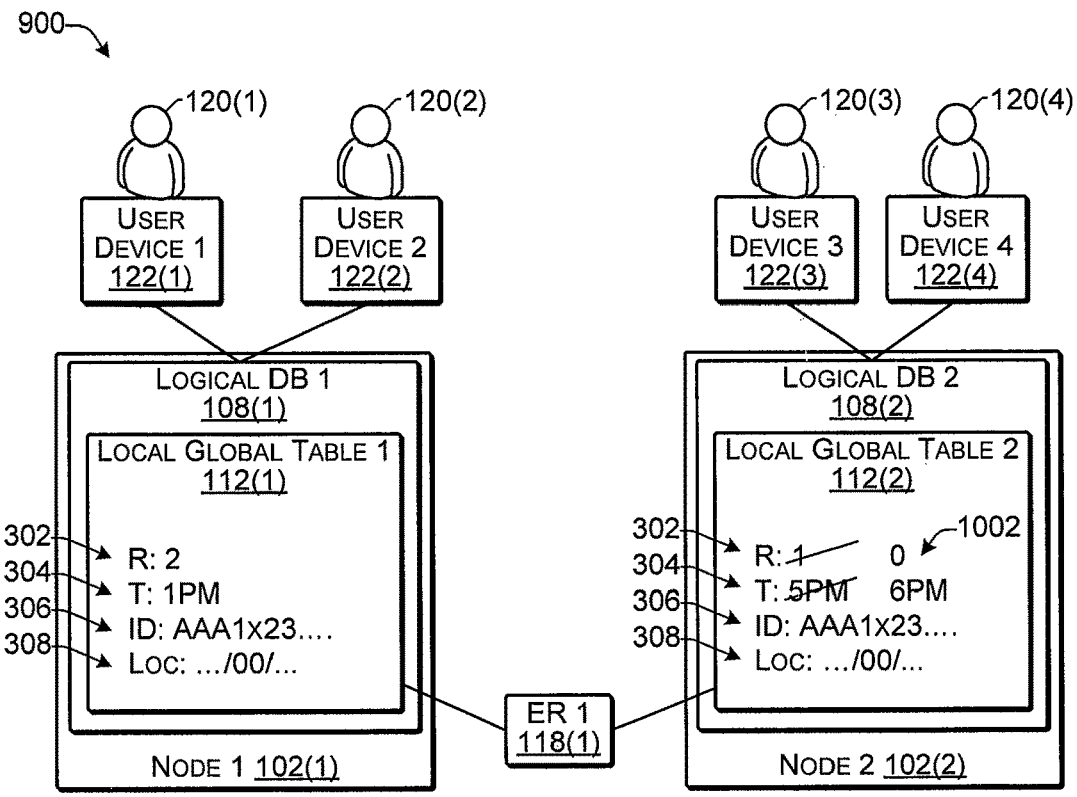
FIGS. 10A and 10B are block diagrams illustrating operations with local global tables for delete and garbage collection operations according to some implementations.
Figure 10B:
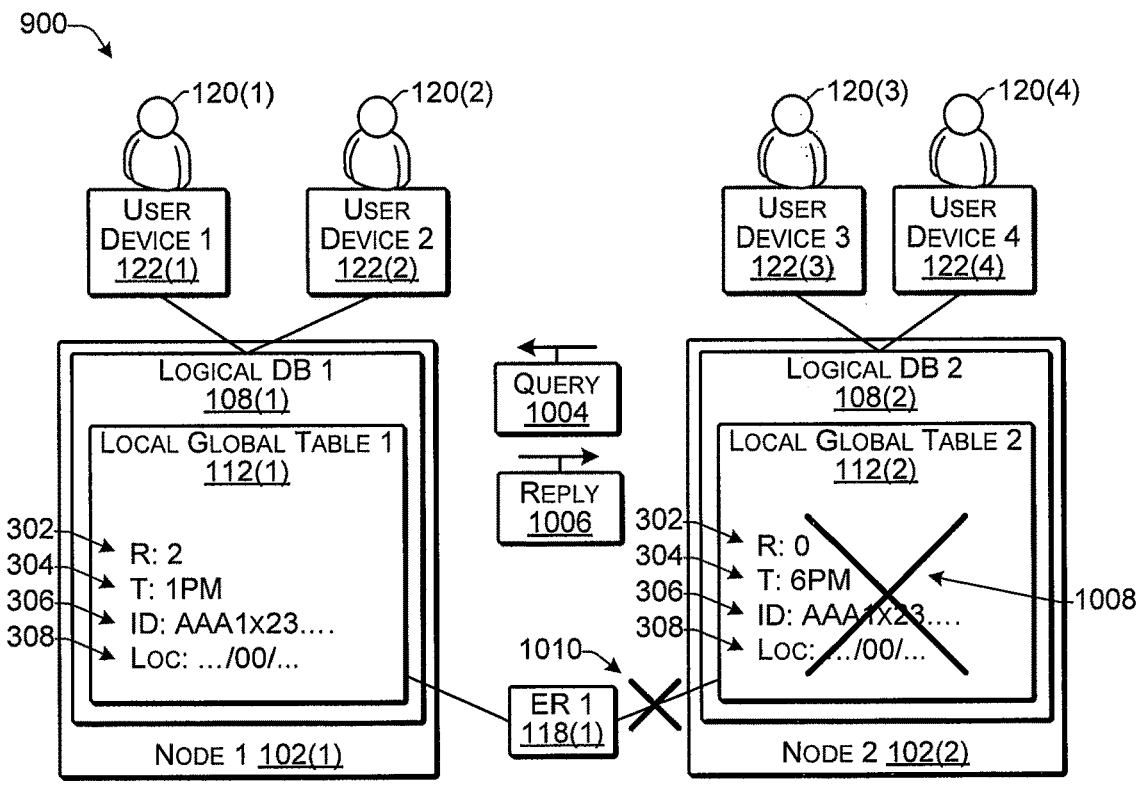

FIGS. 10A and 10B are block diagrams of a system 1000 that may correspond at least in part to the system 100 described above according to some implementations. For any data delete operations, data objects whose number of references is zero and where no updates have been made for a threshold period of time, may be transitioned to an invisible state. When a data object is changed to the invisible state, a query may be sent to all the other nodes having logical databases to determine whether any of the other logical databases contain a reference to the particular data object. If no references are found in the other logical databases, the corresponding external reference may be marked for deletion from the storage system and references to the data object may be deleted from the local logical database. Alternatively, if one or more references to the data object are found in one of the more of the other logical databases, the node merely deletes the reference to the data object from its own logical database.

As illustrated in FIG. 10A, the first logical database 108(1) on the first node 102(1) is accessible by the first user 120(1) and the second user 120(2). Further, the second logical database 108(2) on the second node 102(2) is accessible by the third user 120(3) and the fourth user 120(4). In this example, the first logical database 108(1) includes a first local global table 112(1) that includes two references to the first external resource 118(1), and the second logical database 108(2) includes a second local global table 112(2) that includes one reference to the first external resource 118(1). For instance, suppose that the first user 120(1), the second user 120(2), and the third user 120(4) maintain user references to the external resource 118(1) in their respective database tables (not shown in FIG. 10A), and the fourth user 120(4) does not. Further, suppose that the third user 120(3) decides to delete a file at 6:00 PM that corresponds to the first external reference 118(1). Accordingly, as indicated at 1002, second node reduces the reference count R by one to 0 and atomically updates the timestamp T to 6:00 PM. Thus, the decrement of the reference count R and the update to the timestamp T may be an atomic operation such that it may appear as a unitary or otherwise indivisible operation to other parts of the system.

Subsequently, as illustrated in FIG. 10B, garbage collection may be performed to complete the deletion process. For example, if the reference count R remains at 0 in the local global table 112(2) for a threshold period of time (e.g., 1 hour, 12 hours, 24 hours, a week, a month, etc.), the object state of the data object may be changed from visible to invisible. As one example, the threshold period of time may be selected to be sufficiently long enough to ensure that any data add operations or data migration operations that may be taking place will be complete before the threshold period of time expires. In some cases, changing the status of a data object from visible to invisible may also include moving the metadata for the data object from an entry in the visible object local global table to an entry in the invisible object local global table. A query 1004 may then be sent to the other nodes in the distributed system that include logical databases. For example, the query may ask the other nodes whether there local databases include a reference to at least one of the resource ID 306 or the external resource location 308 (e.g., the path) of the deleted data object. Each queried node may send a reply 1006 to the querying node with a response as to whether they include a reference to the specified data object. If none of the replying nodes include a reference, the external reference 118(1) may be marked for deletion from the storage system. Alternatively, if at least one of the replies 1006 includes an indication that the data object is referenced in at least one logical database on another node, the reference to the data object is deleted only from the local global table 112(2) on the second node, as indicated at 1008, references to the external resources 118(1) are removed as indicated at 1010, and any local data is deleted.

Figure 11:
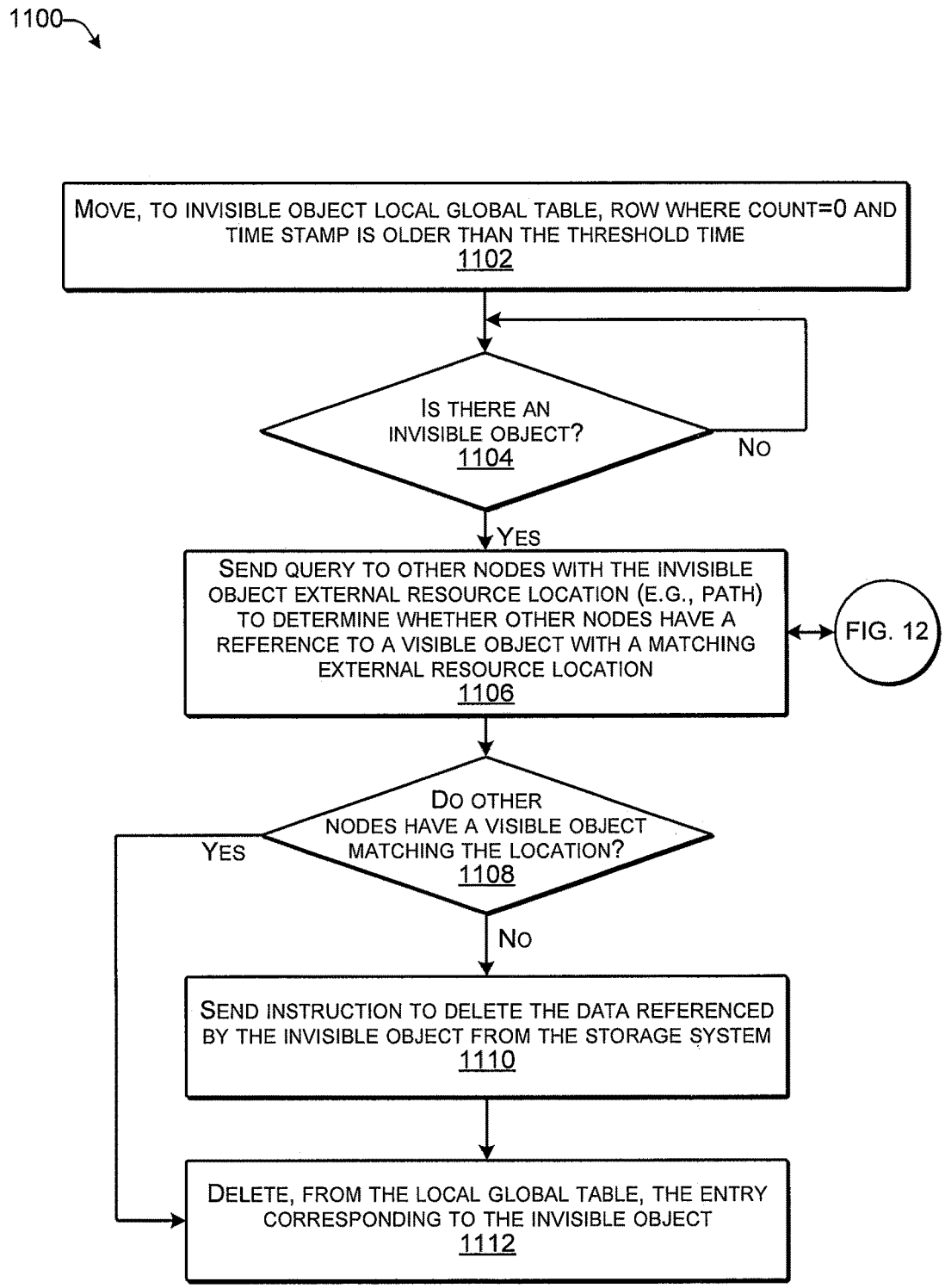
FIG. 11 is a flow diagram illustrating an example process for garbage collection according to some implementations.

FIG. 11 is a flow diagram illustrating an example process 1100 for garbage collection according to some implementations. In some cases, the process 1100 may be performed by at least one node in a distributed system, or other suitable computing device.

At 1102, the node may determine that there is a data object having a reference count equal to zero and a timestamp that is older than a threshold period of time. As mentioned above, the threshold period of time may be selected to be sufficiently long enough to ensure that any data add operations or data migration operations that may be taking place will be complete before the threshold period of time expires. Accordingly, in response to determining that there is a data object with R=0 and a timestamp T older than the threshold period of time, the node may move the metadata for this data object from a visible object local global table to an invisible object local global table. Alternatively, rather than actually moving the metadata to another local global table, the node may otherwise designate the data object for garbage collection. In other words, since the data object is no longer referenced in the local logical database (i.e., has a reference count equal to 0), the corresponding external resource may be ripe for deletion from the storage system 104.

At 1104, the node may determine whether there is an invisible object, such as in an invisible object local global table, or an object that is otherwise in an invisible state, i.e., is no longer referenced in the logical database, and has not been referenced for at least a threshold period of time. If there is no such object, the process waits until there is an object that is ready for garbage collection.

At 1106, in response to identifying an invisible object, the node may send a query with the external resource location 308 of the invisible object to other nodes in the system to determine whether any other nodes in the system have a reference to a visible object with an external resource location 308 (e.g., a path to the external resource on the storage system) matching the external resource location 308 of the invisible object. For example, in some cases, there may be multiple external resources with the same resource ID (e.g., size and hash) but different external resource locations (i.e., different paths). Garbage collection, in some examples herein, may cause deletion of an external resource when no other visible object exists that references the same path, i.e., external resource location 308, rather than just the same resource ID 306. The process performed by the other nodes in response to receiving the query is described with reference to FIG. 12.

At 1108, the node may receive replies from the other nodes and may determine whether any of the other nodes have a reference to a visible object matching the external resource location of the invisible object.

At 1110, if the node determines that there is no other node that has a reference to a visible object that matches the external resource location 308 of the invisible object, the node may send an instruction to cause deletion of the corresponding external resource referenced by the invisible object from the storage system. For example, the node may send a message to the storage system to mark the corresponding external resource for deletion from the storage system.

At 1112, the node deletes, from the local global table, the entry corresponding to the invisible object. For instance, if the result is "No" at 1108, then, after the corresponding external resource has been deleted from the storage system at 1110, the node may, at 1112, delete the entry for the invisible object from the local global table (e.g., the invisible object local global table in some examples).

On the other hand, if at least one other node has a reference to a visible object with an external resource location 308 matching the external resource location 308 of the invisible object (i.e., the result is "Yes" at 1108, the node may delete, from the local global table (e.g., the invisible object local global table in some examples), the entry corresponding to the invisible object, but does not delete the external resource. Thus, the entry for the invisible object is deleted from the node, but the corresponding external resource remains on the storage system because it is still referenced by at least one other local global table on at least one other node.

FIG. 12 is a flow diagram illustrating an example process 1200 executed by a node in response to receiving a query from another node during garbage collection according to some implementations. In some cases, the process 1200 may be performed by at least one node in a distributed system, or other suitable computing device.

At 1202, a second node receives, from a first node, a query with an external resource location to determine whether the second node has a visible object with an external resource location matching the external resource location of the invisible object on the first node.

At 1204, the second node may determine whether a visible object is referenced in the node with an external resource location that matches the external resource location associated with the invisible object. Further, it should be noted that an object having zero references may still be a "visible object". For instance, an unreferenced object may remain "visible" until the threshold period of time has expired, after which the status may be changed to "invisible".

At 1206, if the second node finds a visible object having an external resource location that matches the external resource location of the invisible object, the second node may send a reply to the first node indicating that the second node has a visible object matching the external resource location of the invisible object.

At 1208, on the other hand, if the second node does not find a visible object having an external resource location that matches the external resource location of the invisible object, the second node may send a reply to the first node indicating that the second node does not have a reference to a visible object matching the external resource location of the invisible object.

Figure 13:
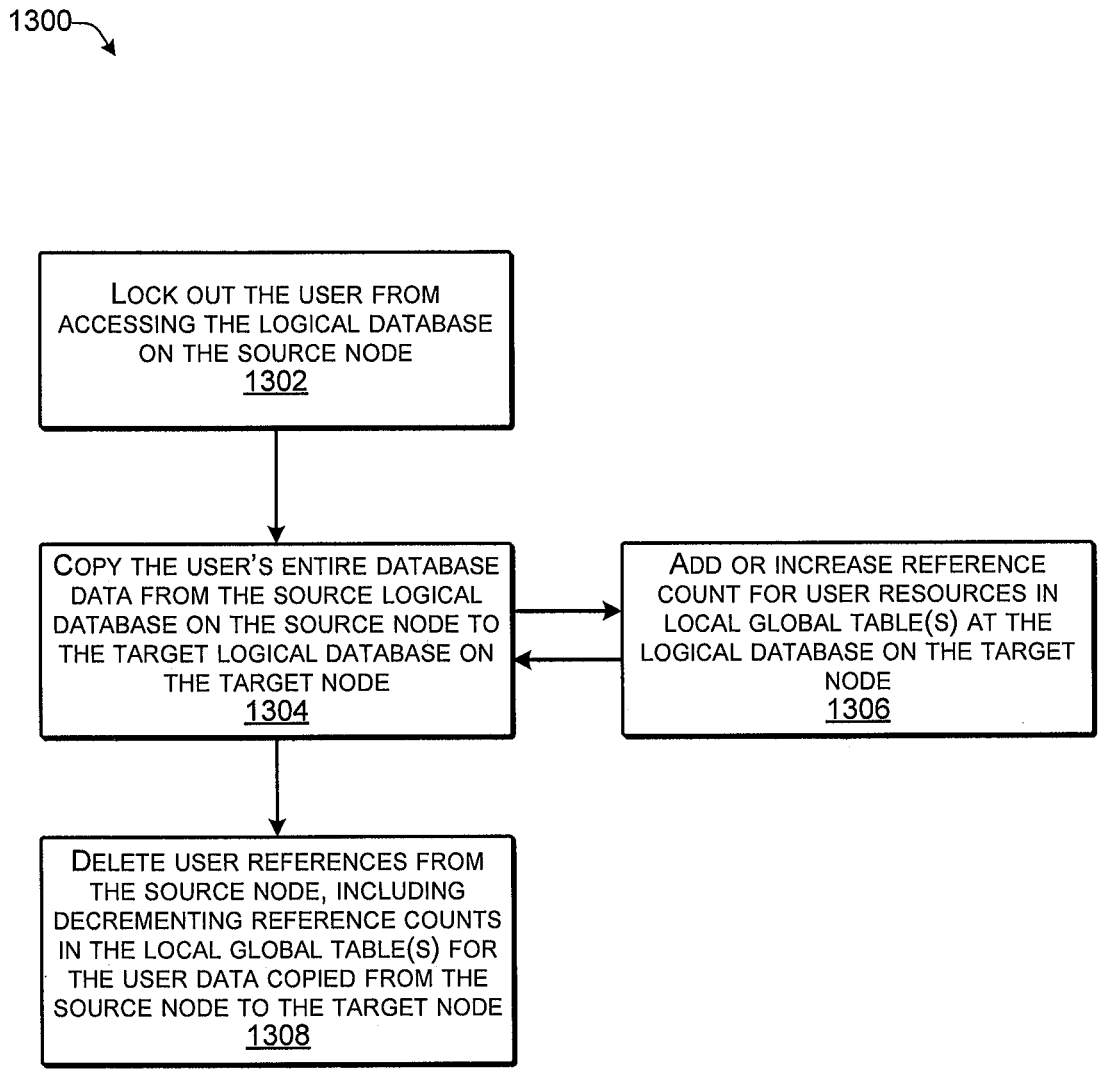
FIG. 13 is a flow diagram illustrating an example process for migrating a user according to some implementations.

FIG. 13 is a flow diagram illustrating an example process 1300 for migrating a user from a source node to a target node according to some implementations. In some cases, the process 1300 may be performed by at least one node in a distributed system or other suitable computing device.

At 1302, during initiation of the migration process, the source node may lock out the user from accessing the logical database on the source node.

At 1304, the source node may copy the user's entire database data from the source logical database on the source node to the target logical database on the target node.

At 1306, the target node may add or increase reference counts in the local global table(s) for the user resources copied to the target logical database at the target node. For example, each reference count to an external resource may be incremented for each reference added by the user data transferred to the target node. Additionally, new local global table entries may be created for references to external resources that were not previously referenced in the target logical database.

At 1308, the source node may delete user references from the source node, including decrementing reference counts in the local global table(s) for the user data copied from the source node to the target node.

Figure 14:
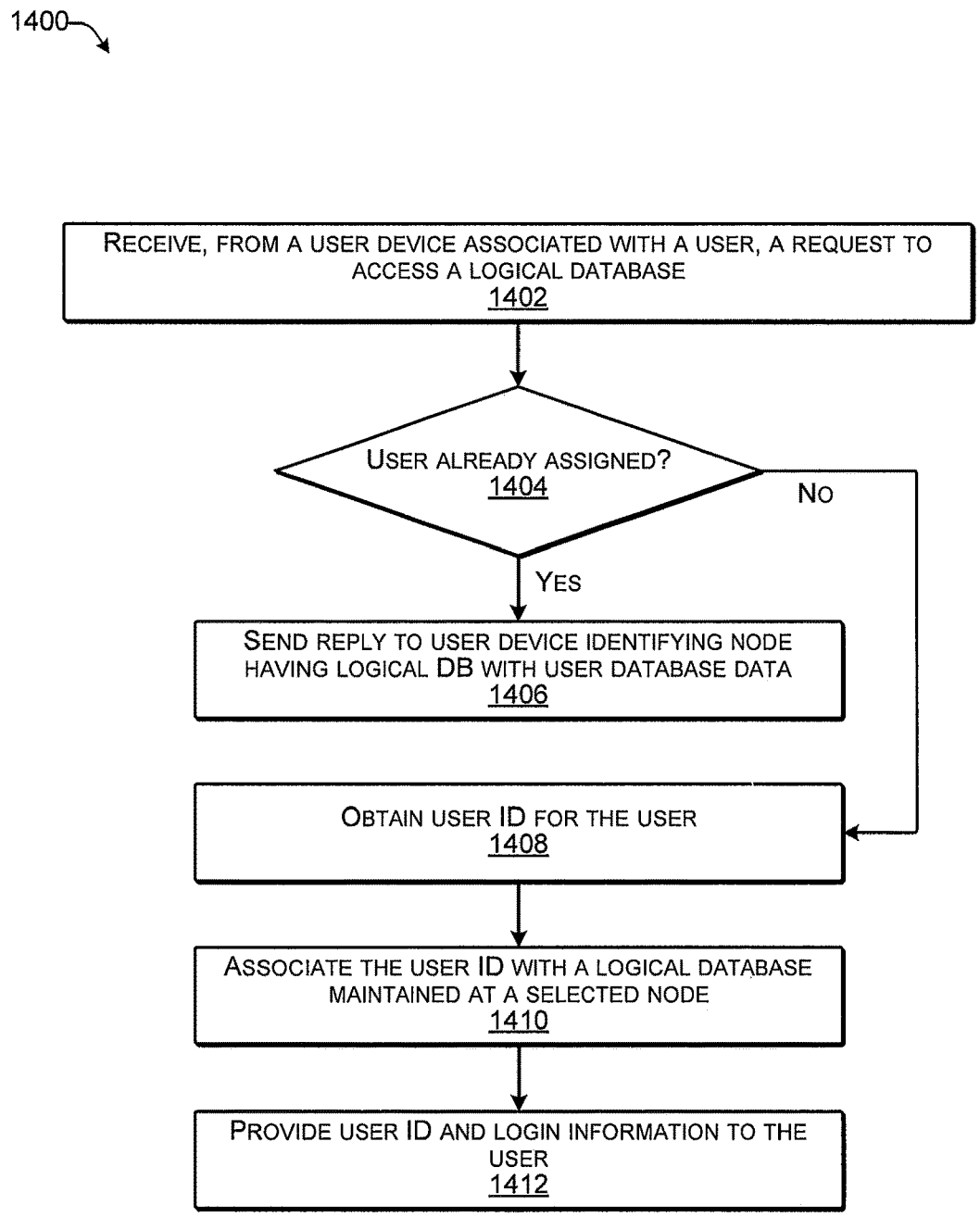
FIG. 14 is a flow diagram illustrating an example process for assigning a user according to some implementations.

FIG. 14 is a flow diagram illustrating an example process 1400 for creating a user in the database system according to some implementations. In some cases, the process 1400 may be performed by at least one node in a distributed system, by a database management computing device, or other suitable computing device.

At 1402, the computing device may receive, from a user device associated with the user, a request to access a logical database in the system. As one example, the user may be a new user who wishes to begin using the database system. As mentioned above, each user may only be permitted to access a single logical database on a particular node since the logical databases are arranged based on partitioning and distribution of data according to user data.

At 1404, the computing device may determine whether the user is already assigned to a particular database on a particular node.

At 1406, if the user is already assigned to a particular database on a particular node, the computing device may send a reply to the user device identifying the node having a logical database including the user database data, and may further provide login credentials, and the like.

At 1408, on the other hand, the user is not already assigned, the computing device may obtain a user ID for the user. For example, in some cases, the computing device may access a designated ID server that may assign a user ID to the user.

At 1410, the computing device may associate the user ID with a logical database maintained at a selected node. For example, the computing device may select a node that is not under a heavy load and/or based on other parameters that may be applicable to the particular user.

At 1412, the computing device may provide the user ID and login information to the user.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a storage storing a plurality of external resources; and
a plurality of nodes including a plurality of logical database portions, such that each node includes a different respective logical database portion maintaining metadata that references a respective portion of the plurality of external resources, each respective logical database portion further being associated with a different respective set of one or more users, wherein:
 each node is programmed to maintain, for each external resource referenced by the respective logical database portion on that node by the respective set of one or more users associated with the respective logical database portion, a reference count of a number of references to each external resource by the respective set of one or more users;
 in response to addition, by a user of the first set of one or more users, of a reference to a particular external resource in a first logical database portion associated with the first set of one or more users, a first node including the first logical database portion is programmed to increment the reference count for the particular external resource in the first logical database portion; and
 in response to removal of a reference to the particular external resource in a second logical database portion associated with a second node and a second set of one or more users, the reference count in the first logical database portion maintained by the first node remains unchanged for the particular external resource.

2. The system as recited in claim 1, wherein the first node is programmed to:
add the reference to the particular external resource in the first logical database portion in response, at least in part, to receiving, from a user device associated with the first set of one or more users, a request to add a data object;
determine whether a reference to the particular external resource matching content of the data object exists on the first node; and
in response to determining that a reference to the particular external resource exists on the first node, increment the reference count for the particular external resource on the first node.

3. The system as recited in claim 2, wherein the first node is programmed to:

update time information associated with the reference count based at least in part on a time associated with receipt of the request to add the data object.

4. The system as recited in claim 1, wherein the first node is programmed to:
add the reference to the particular external resource in the first logical database portion in response, at least in part to receiving, from a user device associated with the first set of one or more users, a request to add a data object;
determine whether a reference to the particular external resource matching content of the data object exists on the first node;
in response to determining that a reference to the particular external resource does not exist on the first node, send a query to at least one other node of the plurality of nodes to determine whether a reference to the particular external resource is maintained on the at least one other node; and
in response to receiving an indication from the at least one other node that a reference to the particular external resource is maintained on the other node, creating a new entry for the data object in a reference data structure on the first node, the new entry including a reference count incremented to one, without saving the data object to the storage, and associating time information with the reference count, the time information based at least in part on a time associated with receipt of the request to add the data object.

5. The system as recited in claim 4, wherein the first node is programmed to:
receive storage location information for the particular external resource from the at least one other node; and
associate the storage location information with the new entry in the reference data structure on the first node.

6. The system as recited in claim 4, wherein:
the first node is programmed to send, with the query to the at least one other node, the time information, wherein sending the query to the at least one other node causes, at least in part, the at least one other node to update a time associated with the reference to the particular external object based on the time information sent with the query.

7. The system as recited in claim 1, wherein the first node is programmed to:
add the reference to the particular external resource in the first logical database portion in response, at least in part to receiving, from a user device associated with the first set of one or more users, a request to add a data object;
determine whether a reference to the particular external resource matching content of the data object exists on the first node;
in response to determining that a reference to the particular external resource does not exist on the first node, send a query to other nodes of the plurality of nodes to determine whether a reference to the particular external resource is maintained on at least one other node; and
in response to receiving indications from the other nodes that a reference to the particular external resource is not maintained on the other nodes, create a new entry for the data object in a reference data structure on the first node, the new entry including a reference count incremented to one and time information associated with the reference count, the time information based at least in part on a time associated with receipt of the request to add the data object; and
send an instruction to cause the data object to be stored at the storage as one of the external resources.

8. The system as recited in claim 1, wherein the first node is programmed to:
remove the reference to the particular external resource in the first logical database portion in response, at least in part to receiving a deletion instruction from a user device associated with the first set of one or more users;
in response to determining that the reference count for the particular external resource was decremented to zero, send a query to other nodes of the plurality of nodes to determine whether a reference to the particular external resource is maintained on at least one other node; and
in response to receiving an indication from the at least one other node that a reference to the particular external resource is maintained on the other node, remove information related to the external resource from a reference data structure on the first node.

9. The system as recited in claim 1, wherein the first node is programmed to:
remove the reference to the particular external resource in the first logical database portion in response, at least in part to receiving a deletion instruction from a user device associated with the first set of one or more users;
in response to determining that the reference count for the particular external resource was decremented to zero, send a query to other nodes of the plurality of nodes to determine whether a reference to the particular external resource is maintained on at least one other node; and
in response to receiving an indication from the other nodes that a reference to the particular external resource is not maintained on the other nodes, send an instruction to delete the particular external resource from the storage, and remove information related to the external resource from a reference data structure on the first node.

10. The system as recited in claim 1, wherein, to migrate a particular user from the first set of one or more users to the second set of one or more users, the first node is programmed to migrate data of the particular user to the second node of the plurality of nodes by:
sending a copy of the data of the particular user to the second node;
decrementing reference counts maintained on the first node for the external resources referenced by the data of the particular user;
updating time information associated with the decremented reference counts; and
deleting user references of the particular user from the first node.

11. A method executed by a first node of a plurality of nodes in communication with a storage system that stores a plurality of external resources, wherein each node of the plurality of nodes maintains a different respective logical database portion that references a respective portion of the external resources stored by the storage system, each respective logical database portion further being associated with a different respective set of one or more users, the method comprising:
receiving, by the first node, from a computing device associated with a first user of a first set of one or more users associated with a first logical database portion maintained at the first node, a request to add a first data object;
searching, by the first node, a first reference data structure included in the first logical database portion maintained at the first node, the first reference data structure including, for each external resource referenced by the first logical database portion on the first node, a reference count of a number of references in the respective first logical database portion to each individual external resources referenced by the first set of one or more users, wherein the searching comprises searching for an entry in the first reference data structure referring to a particular external resource having content that matches content of the first data object;
in response to determining that a reference to the particular external resource does not exist in the first reference data structure included in the first logical database portion on the first node, sending a query to at least one other node of the plurality of nodes to determine whether a reference to the particular external resource is maintained in a second reference data structure included in a second logical database portion maintained on the at least one other node; and
in response to receiving an indication from a second node of the plurality of nodes that a reference to the particular external resource is maintained in the second reference data structure included in the second logical database portion maintained on the second node, creating a new entry for the first data object in the first reference data structure included in the first logical database portion on the first node without saving the first data object to the storage system.

12. The method as recited in claim 11, further comprising:
creating the new entry for the first data object in the first reference data structure on the first node by including a reference count incremented to one and time information associated with the reference count, the time information based at least in part on a time associated with receipt of the request to add the first data object.

13. The method as recited in claim 12, further comprising:
sending, with the query to the at least one other node, the time information, wherein the sending the time information causes, at least in part, the second node having the reference to the particular external resource to update, in the second reference data structure included in the second logical database portion maintained on the second node, a time associated with the reference to the particular external resource based on the time information sent with the query.

14. The method as recited in claim 11, further comprising:
receiving, by the first node, from the computing device associated with the first user, a request to add a second data object;
searching, by the first node, the first reference data structure included in the first logical database portion maintained at the first node, for an entry in the first reference data structure referring to an certain external resource having content that matches content of the second data object;
in response to determining that a reference to the certain external resource does not exist in the first reference data structure included in the first logical database portion on the first node, sending a query to at least one other node of the plurality of nodes to determine whether a reference to the certain external resource is maintained in another reference data structure included in another logical database portion maintained on the at least one other node;
in response to receiving an indication from the at least one other node that a reference to the particular external resource is not maintained in another logical database portion on another node of the plurality of nodes, creating a new entry for the second data object in the first reference data structure on the first node, the new entry including a reference count incremented to one and time information associated with the reference count, the time information based at least in part on a time associated with receipt of the request to add the second data object; and sending an instruction to cause the second data object to be stored at the storage system as one of the external resources.

15. The method as recited in claim 11, further comprising:
determining a resource identifier (ID) based at least in part on the content of the first data object;
during the searching of the first reference data structure, comparing the resource ID of the first data object with resource IDs corresponding to the external resources referenced in the first reference data structure; and
sending the resource ID of the first data object with the query to the at least one other node.

16. A system enabling horizontal scaling of data across a plurality of logical database portions, the system comprising:
a storage system storing a plurality of files as external resources; and
a plurality of nodes including the plurality of logical database portions, such that each node includes a different respective logical database portion, each logical database portion including metadata that references a subset of the plurality of external resources, each respective logical database portion further being associated with a different respective set of one or more users, wherein:
each node is programmed to maintain, for each external resource referenced by the respective logical database portion on that node by the respective set of one or more users associated with the respective logical database portion, as part of the respective logical database portion, a respective local global table that includes a reference count of a number of references in the respective logical database portion to each external resource, a resource identifier (ID) that is based at least in part on content of a corresponding external resource, and time information that is associated with the reference count; and
in response to addition of a reference to a particular external resource in a first one of the logical database portions, by a user of a first set of one or more users associated with the first logical database portion, a first node including the first logical database portion is programmed to increment the reference count for the particular external resource in a first local global table included in the first logical database portion maintained by the first node, and update the time information associated with the reference count for the particular external resource based at least in part on a time associated with the addition of the reference to the particular external resource.

17. The system as recited in claim 16, wherein:
in response to removal of the reference to the particular external resource in the first logical database portion, the first node is programmed to decrement the reference count for the particular external resource in the first local global table maintained by the first node and update the time information associated with the reference count for the particular external resource based at least in part on a time associated with decrementing the reference count;
in response to determining that a threshold amount of time has passed since the reference count for the particular external resource was decremented to zero, the first node is programmed to send a query to other nodes of the plurality of nodes to determine whether a reference to the particular external resource is maintained on a respective other logical database portion maintained on at least one other node; and in response to receiving an indication from the at least one other node that a reference to the particular external resource is maintained in the respective other logical database portion on the other node, the first node is programmed to remove information related to the external resource from the first local global table in the logical database portion maintained on the first node.

18. The system as recited in claim 16, wherein:
in response to removal of the reference to the particular external resource in the first logical database portion, the first node is programmed to decrement the reference count for the particular external resource in the first local global table maintained by the first node and update the time information associated with the reference count for the particular external resource based at least in part on a time associated with decrementing the reference count;
in response to determining that a threshold amount of time has passed since the reference count for the particular external resource was decremented to zero, the first node is programmed to send a query to other nodes of the plurality of nodes to determine whether a reference to the particular external resource is maintained in a respective other logical database portion on at least one other node; and
in response to receiving an indication from the other nodes that a reference to the particular external resource is not maintained in the respective other logical database portions on the other nodes, the first node is programmed to send an instruction to delete the particular external resource from the storage, and remove information related to the external resource from a reference data structure included in the first logical database portion maintained on the first node.

19. The system as recited in claim 16, wherein the first node is programmed to:
receive, from another node of the plurality of nodes, a query with a first resource identifier (ID) of a file requested to be added at the other node, wherein the resource identifier is based at least in part on content of the file;
search the first local global table of the first logical database portion for an entry including a resource ID of an external resource that matches the resource ID received with the query; and
in response to finding a matching resource ID in the first local global table in the first logical database portion, send information associated with a corresponding entry in the first local global table to the other node.

20. The system as recited in claim 19, the first node is programmed to: update time information associated with the entry in the first local global table in the first logical database portion based at least in part on time information received with the query and associated with the receipt of the request to add the file.

* * * * *